United States Patent
Reynolds et al.

(10) Patent No.: US 11,555,916 B2
(45) Date of Patent: Jan. 17, 2023

(54) MILLIMETER WAVE AND/OR MICROWAVE IMAGING SYSTEMS AND METHODS INCLUDING EXAMPLES OF PARTITIONED INVERSE AND ENHANCED RESOLUTION MODES AND IMAGING DEVICES

(71) Applicant: University of Washington, Seattle, WA (US)

(72) Inventors: Matthew S. Reynolds, Seattle, WA (US); Andreas Pedross-Engel, Seattle, WA (US); Claire Watts, Seattle, WA (US); Sandamali Devadithya, Seattle, WA (US)

(73) Assignee: University of Washington, Seattle, WA (US)

( * ) Notice: Subject to any disclaimer, the term of this patent is extended or adjusted under 35 U.S.C. 154(b) by 648 days.

(21) Appl. No.: 16/467,819

(22) PCT Filed: Dec. 8, 2017

(86) PCT No.: PCT/US2017/065435
§ 371 (c)(1),
(2) Date: Jun. 7, 2019

(87) PCT Pub. No.: WO2018/147929
PCT Pub. Date: Aug. 16, 2018

(65) Prior Publication Data
US 2021/0405182 A1 Dec. 30, 2021

Related U.S. Application Data

(60) Provisional application No. 62/431,754, filed on Dec. 8, 2016, provisional application No. 62/432,375, filed
(Continued)

(51) Int. Cl.
*G01S 13/90* (2006.01)
*G01S 13/89* (2006.01)
*G01S 13/88* (2006.01)

(52) U.S. Cl.
CPC ............ *G01S 13/90* (2013.01); *G01S 13/888* (2013.01); *G01S 13/89* (2013.01); *G01S 13/9004* (2019.05)

(58) Field of Classification Search
CPC ........................................ G01S 13/88
See application file for complete search history.

(56) References Cited

U.S. PATENT DOCUMENTS 5,323,162 A    6/1994  Fujisaka et al.
5,956,318 A    9/1999  Saeki
(Continued)

FOREIGN PATENT DOCUMENTS

JP    H06118166 A    4/1994
JP    H09178846 A    7/1997
(Continued)

OTHER PUBLICATIONS

A. Dienstfrey and P. D. Hale, "Colored Noise and Regularization Parameter Selection for Waveform Metrology," in IEEE Transactions on Instrumentation and Measurement, vol. 63, No. 7, pp. 1769-1778, Jul. 2014, doi: 10.1109/TIM.2013.2297631. (Year: 2014).*
(Continued)

*Primary Examiner* — Timothy A Brainard
*Assistant Examiner* — Hailey R Le
(74) *Attorney, Agent, or Firm* — Stoel Rives LLP

(57) ABSTRACT

Examples of imaging systems are described herein which may implement microwave or millimeter wave imaging systems. Examples described may implement partitioned inverse techniques which may construct and invert a measurement matrix to be used to provide multiple estimates of reflectivity values associated with a scene. The processing may be partitioned in accordance with a relative position of the antenna system and/or a particular beamwidth of an antenna. Examples described herein may perform an
(Continued)

enhanced resolution mode of imaging which may steer beams at multiple angles for each measurement position.

20 Claims, 5 Drawing Sheets

Related U.S. Application Data on Dec. 9, 2016, provisional application No. 62/432,307, filed on Dec. 9, 2016.

(56) References Cited

U.S. PATENT DOCUMENTS

| | | | |
|---|---|---|---|
| 6,115,423 | A | 9/2000 | Shen et al. |
| 6,115,426 | A | 9/2000 | Fujimoto et al. |
| 6,563,462 | B1 | 5/2003 | Moffa et al. |
| 6,917,327 | B2 | 7/2005 | Jenkins |
| 7,259,715 | B1 | 8/2007 | Garren et al. |
| 7,460,055 | B2 | 12/2008 | Nishijima et al. |
| 7,978,120 | B2 | 7/2011 | Longstaff |
| 8,643,286 | B2 | 2/2014 | Schenk et al. |
| 8,855,580 | B2 | 10/2014 | Dent et al. |
| 9,099,786 | B2 | 8/2015 | Bowers et al. |
| 9,105,978 | B2 | 8/2015 | Bowers et al. |
| 9,268,016 | B2 | 2/2016 | Smith et al. |
| 10,320,084 | B2 | 6/2019 | Bily et al. |
| 2004/0021600 | A1 | 2/2004 | Wittenberg |
| 2008/0292163 | A1 | 11/2008 | Dibella et al. |
| 2009/0123046 | A1 | 5/2009 | Mielekamp et al. |
| 2009/0123048 | A1 | 5/2009 | Leroux |
| 2009/0237092 | A1 | 9/2009 | Zoughi et al. |
| 2010/0220001 | A1 | 9/2010 | Longstaff |
| 2011/0012777 | A1* | 1/2011 | Tomich ............... G01S 13/9023 342/25 A |
| 2011/0051780 | A1 | 3/2011 | Kawasaki |
| 2011/0122477 | A1 | 5/2011 | Ridgway |
| 2011/0181461 | A1* | 7/2011 | Sarkis ..................... G06T 5/50 342/179 |
| 2011/0199254 | A1 | 8/2011 | Bishop et al. |
| 2012/0194399 | A1 | 8/2012 | Bily et al. |
| 2012/0293359 | A1 | 11/2012 | Fukuda et al. |
| 2013/0022222 | A1 | 1/2013 | Zschau et al. |
| 2013/0162490 | A1 | 6/2013 | Biech |
| 2014/0111367 | A1 | 4/2014 | Kishigami et al. |
| 2014/0232591 | A1 | 8/2014 | Liu et al. |
| 2015/0207224 | A1 | 7/2015 | Rose |
| 2015/0285901 | A1 | 10/2015 | Rose |
| 2016/0065323 | A1 | 3/2016 | Zemp |
| 2016/0066811 | A1 | 3/2016 | Mohamadi |
| 2016/0124075 | A1 | 5/2016 | Vogt et al. |
| 2017/0010352 | A1 | 1/2017 | Liu et al. |
| 2018/0017667 | A1* | 1/2018 | Rose ..................... G01S 15/89 |
| 2018/0159199 | A1* | 6/2018 | Kolokotronis ......... H01Q 1/246 |
| 2019/0265347 | A1* | 8/2019 | Wintermantel ....... G01S 13/343 |
| 2021/0278526 | A1 | 9/2021 | Pedross-engel et al. |

FOREIGN PATENT DOCUMENTS

| | | | |
|---|---|---|---|
| JP | 2011135484 | A | 7/2011 |
| JP | 2013065995 | A | 4/2013 |
| JP | 2013113645 | A | 6/2013 |
| JP | 2014182124 | A | 9/2014 |
| JP | 2014202670 | A | 10/2014 |
| WO | 9853556 | A2 | 11/1998 |
| WO | 2013024583 | A1 | 2/2013 |
| WO | 2018089068 | A1 | 5/2018 |

OTHER PUBLICATIONS

JP Office Action dated Aug. 24, 2021 for JP Appl. No. 2019-530499.
Extended European Search Report for EP Application No. 17895759.3, dated Jul. 1, 2020.
Devadithya, Sandamali , "Computational Imaging for Dynamic Metasurface Based Synthetic Aperture Radars", Retrieved from the Internet: URL: https://digital.lib.washington.edu/researchworks/handle/1773/40045, retrieved Aug. 19, 2019, p. 1-73.
Devadithya, Sandamali et al., "GPU Accelerated Partitioned Reconstruction Algorithm for Millimeterwave 3D Synthetic Aperture Radar (SAR) Images", 2017 IEEE MTT-S International Microwave Symposium (IMS), June 4. 2017, p. 1983-1986.
Devadithya, Sandamali et al., "Partitioined Inverse Image Reconstruction for Millimeter-Wave SAR Imaging", 2017 IEEE International Conference on Acoustics, Speech and Signal Processing (ICASSP), Mar. 5, 2017, p. 6060-6064.
Watts, Claire M. et al., "2D and 3D Millimeter-Wave Synthetic Aperture Radar Imaging on a PR2 Platform", 2016 IEEE/ RSJ International Conference on Intelligent Robots and Systems (IROS), Oct. 9, 2016, p. 4304-4310.
U.S. Appl. No. 16/323,491 titled "Millimeter Wave Imaging Systems and Methods Using Direct Conversion Receivers and/or Modulation Techniques" filed Aug. 10, 2017.
U.S. Appl. No. 16/467,819 titled "Millimeter Wave and/or Microwave Imaging Systems and Methods Including Examples of Partioned Inverse and Enhanced Resolution Modes and Imaging Devices" filed Dec. 8, 2017.
Albert, Arthur E. , "Regression and the Moore-Penrose Pusedoinverse", Academic Press, Oct. 1972.
Appleby, et al., Millimeter-Wave and Submillimeter-Wave Imaging for Security and Surveillance, Proceedings of the IEEE, Aug. 2007, 8 pages.
Balanis, Constantine A. , "Antenna Theory", Analysis and Design, 3 ed. Wiley-Interscience, 2005. Chapter 3.
Belcher, D.P. et al., "High Resolution Processing of Hybrid Strip-Map/Spotlight Mode SAR", IEE Proceedings-Radar, Sonar Navigation., vol. 143, No. 6, Dec. 1996, p. 366-374.
Bowen, Patrick T. et al., "Using a Discrete Dipole Approximation to Predict Complete Scattering of Complicated Metamaterials", New Journal of Physics, vol. 14, No. 3, p. 033038, Mar. 2012.
Carrara, Walter G. et al., "Synthetic Aperture Radar Fundamentals", Spotlight Synthetic Aperture Radar: Signal Processing Algorithms, Chapter 2, Artech House Publishers, Oct. 1995.
Cerutti-Maori, Delphine et al., "MIMO SAR Processing for Multichannel High-Resolution Wide-Swath Radars", IEEE Transactions on Geoscience and Remote Sensing, vol. 52, No. 8, Aug. 2014, p. 5034-5055.
Charvat, et al., An Ultrawideband (UWB) Switched-Antenna-Array Radar Imaging System, 2010 IEEE International Symposium on Phased Array Systems and Technology, Oct. 2010, 8 pages.
Cumming, et al., Digital Processing of Synthetic Aperture Radar Data: Algorithms and Implementation, Artech House, 2005.
Cumming, Ian G. et al., "Digital Processing of Seasat SAR Data", Acoustics, Speech, and Signal Processing, IEEE International Conference on ICASSP, vol. 4, Apr. 1979, p. 710-718.
Devadithya, et al., GPU Accelerated Partitioned Reconstruction Algorithm for Millimeter-Wave 3D Synthetic Aperture Radar (SAR) Images, 2017 IEEE MTT-S International Microwave Symposium (IMS), Jun. 2017, 4 pages.
Devadithya, et al., Partitioned Inverse Image Reconstruction for Millimeter-Wave SAR Imaging, 2017 IEEE International Conference on Acoustics, Speech and Signal Processing, Mar. 2017, 5 pages.
Devadithya, Sandamali , "Computational Imaging for Dynamic Metasurface Based Synthetic Aperture Radars", University of Washington, A thesis submitted in partial fulfilment of the requirements for the degree of Master of Science in Electrical Engineering, Aug. 2018.
Eld'en, et al., Solving ILL-Posed Linear Systems With GMRES and a Singular Preconditioner, SIAM Journal on Matrix Analysis and Applications, vol. 33, No. 4, Dec. 2012, 26 pages.
Franceschetti, Giorgio et al., "Efficient Simulation of Hybrid Stripmap/Spotlight SAR Raw Signals From Extended Scenes", IEEE Transactions on Geoscience and Remote Sensing, vol. 42, No. 11, Nov. 2004, p. 2385-2396.

(56) References Cited

OTHER PUBLICATIONS

Fromenteze, et al., Computational imaging using a mode-mixing cavity at microwave frequencies, Applied Physics Letters, May 2015, 6 pages.

Fulton, Caleb et al., "Digital Phased Arrays: Challenges and Opportunities", Proceedings of the IEEE, vol. 104, No. 3, p. 487-503, Mar. 2016.

Georgiou, et al., Hadamard matrices, orthogonal designs and construction algorithms, University of Wollongong Research Online, 2002, 59 pages.

Gollub, et al., Large Metasurface Aperture for Millimeter Wave Computational Imaging at the Human-Scale, www.nature.com/scientificreports, Feb. 2017, 9 pages.

Gresham, Ian et al., "Ultra-Wideband Radar Sensors for Short-Range Vehicular Applications", IEEE Transactions on Microwave Theory and Techniques, vol. 52, No. 9, Sep. 2004, p. 2105-2122.

Hansen, Per Christian et al., "The Use of the L-Curve in the Regularization of Discrete ILL-Posed Problems", SIAM Journal on Scientific Computing, vol. 14, No. 6, p. 1487-1503, Nov. 1993.

Hashemi, et al., The Indoor Radio Propagation Channel, Proceedings of the IEEE, vol. 81, No. 7, Jul. 1993, 26 pages.

Haupt, , Antenna Arrays: A Computational Approach, Wiley-IEEE Press, Apr. 2010.

Hellsten, Hans et al., "An Inverse Method for the Processing of Synthetic Aperture Radar Data", Inverse Problems, vol. 3, No. 1, Feb. 1987, p. 111.

Holloway, et al., An Overview of the Theory and Applications of Metasurfaces: The Two-Dimensional Equivalents of Metamaterials, IEEE Antennas and Propagation Machine, vol. 54, No. 2, Apr. 2012, 26 pages.

Hunt, et al., Metamaterial Apertures for Computational Imaging, Science, vol. 339, Jan. 2013, 5 pages.

Hunt, John et al., "Metamaterial Microwave Holographic Imaging System", Journal of the Optical Society of America A, vol. 31, No. 10, p. 2109-2119, Oct. 2014.

Hunt, John et al., "Metamaterial Microwave Holographic Imaging System", Optical Society of America, vol. 31, No. 1, Oct. 2014, p. 2109-2119.

Imani, et al., Analytical modeling of printed metasurface cavities for computational imaging, Journal of Applied Physics, Oct. 2016, 15 pages.

Jin, et al., Design and Performance of a New Digital Phase Shifter at X-Band, IEEE Microwave and Wireless Components Letters, vol. 14, No. 9, Sep. 2004, 3 pages.

Klauder, et al., The Theory and Design of Chirp Radars, The Bell System Technical Journal, Jul. 1960, 64 pages.

Krieger, Gerhard , "MIMO-SAR: Opportunitiesand Pitfalls", IEEE Transactions on Geoscience and Remote Sensing, vol. 52, No. 5, May 2014 p. 2628-2645.

Larouche, Stéphane et al., "Infrared Metamaterial Phase Holograms", Nature Materials, vol. 11, May 2012, p. 450-454.

Lipworth, et al., Metamaterial apertures for coherent computational imaging on the physical layer, Journal of the Optical Society of America, Aug. 2013, 10 pages.

Mailloux, Robert J. , "Phased Array Antenna Handbook", Elements for Phased Arrays, 1ed. Artech House, Feb. 1994, Chapter 5.

Marks, et al., Fourier Accelerated Multistatic Imaging: A Fast Reconstruction Algorithm for Multiple-Input-Multiple-Output Radar Imaging, IEEE Access, Feb. 2017, 14 pages.

Melvin, et al., Principles of Modern Radar: Advanced Techniques, SciTech Publishing, 2013, 25 pages.

Menke, William , "Geophysical Data Analysis: Discrete Inverse Theory", International Geophysics Series, Academic Press, London, Jan. 1984.

Moreira, et al., A Tutorial on Synthetic Aperture Radar, IEEE Geoscience and Remote Sensing Magazine, Mar. 2013, 38 pages.

Moreira, Alberto , "Real-Time Synthetic Aperture Radar (SAR) Processing With a New Subaperture Approach", IEEE Transactions on Geoscience and Remote Sensing, vol. 30, No. 4, p. 714-722, Jul. 1992.

Munson, David C. et al., "A Signal Procssing View of Strip-Mapping Synthetic Aperture Radar", IEEE Transactions on Acoustics, Speech, and Signal Processing, vol. 37, No. 12, Dec. 1989, p. 2131-2147.

Oppenheim, Alan V. et al., "Discrete-Time Signal Processing", Pearson Education Limited, Jul. 2013.

Orfanidis, Sophocles J. , "Electromagnetic Waves and Antennas", Rutgers University, Aug. 2016.

Papoulis, et al., Probability, Random Variables, and Stochastic Processes, McGraw Hill, 2002, 861 pages.

Patrick, et al., Multimode illumination for speckle reduction and angle neutrality in millimeter wave active imaging: range and time-resolved mode averaging, Journal of Optical Society of America, Oct. 2014, 7 pages.

Patrick, et al., Range resolved mode mixing in a large volume for the mitigation of speckle and strategic target orientation requirements in active millimeter-wave imaging, Journal of the Optical Society of America, Apr. 2015, 10 pages.

Pedross-Engel, et al., Orthogonal Coded Active Illumination for Millimeter Wave, Massive-MIMO Computational Imaging With Metasurface Antennas, IEEE Transactions on Computational Imaging, vol. 4, No. 2, Jun. 2018, 10 pages.

Pedross-Engel, , Self-Jamming and DC Offset Mitigation for Millimeter-Wave Imaging and Channel Estimation with Direct Conversion Receivers, Aug. 2016.

Pedross-Engel, et al., Self-Jamming Mitigation via Coding for Millimeter-Wave Imaging With Direct Conversion Receivers, IEEE Microwave and Wireless Components Letters, Apr. 2017, 3 pages.

Proakis, John et al., "Digital Communications", Digital Communications, 5th ed., McGraw-Hill, Nov. 2007.

Raneu, Keith R. et al., "Precision SAR Processing Using Chirp Scaling", IEEE Transactions on Geoscience and Remote Sensing, vol. 32, No. 4, Jul. 1994, p. 786-799.

Rankin, et al., Millimeter Wave Array for UAV Imaging MIMO Radar, 16th International Radar Symposium (IRS), Jun. 2015, 6 pages.

Rosen, Paul et al., "The NASA-ISRO SAR Mission—An International Space Partnership for Science and Societal Benefit", IEEE Radar Conference (RadarCon). Oct. 2015, p. 1610-1613.

Saad, et al., GMRES: A Generalized Minimal Residual Algorithm for Solving Nonsymmetric Linear Systems, SIAM Journal on Scientific and Statistical Computing, vol. 7, No. 3, Jul. 1986, 14 pages.

Sack, M. et al., "Application of Efficient Linear FM Matched Filtering Algorithms to Synthetic Aperture Radar Processing", Communications, Radar and Signal Processing, IEEE Proceedings F, vol. 132, No. 1, p. 45-57, Feb. 1985.

Sharma, et al., A Ku-Band 6-bit Digital Phase Shifter MMIC for Phased Array Antenna Systems, IEEE International Microwave and RF Conference, Dec. 2015, 4 pages.

Sheen, et al., Three-Dimensional Millimeter-Wave Imaging for Concealed Weapon Detection, IEEE Transactions on Microwave Theory and Techniques, vol. 49, No. 9, Sep. 2001, 12 pages.

Sleasman, Timothy et al., "Design Considerations for a Dynamic Metamaterial Aperture for Computational Imaging at Microwave Frequencies", Journal of the Optical Society of America B, vol. 33, No. 6, Jun. 2016, p. 1098-1111.

Smith, et al., Analysis of a Waveguide-Fed Metasurface Antenna, American Physical Society, Nov. 2017, 16 pages.

Smith, et al., Analysis of a Waveguide-Fed Metasurface Antenna, Physical Review Applied, Nov. 2017.

Solimene, Raffaele et al., "SAR Imaging Algorithms and Some Uncommon Applications: A Unified Mathematical Overview", IEEE Signal Processing Magazine, Jul. 2014, p. 90-98.

Spence, , Classification of Hadamard matrices of order 24 and 28, Discrete Mathematics, Jun. 1995, 59 pages.

Stark, Louis "Microwave Theory of Phased-Array Antennas—A Review", Proceedings of the IEEE, vol. 62, No. 12, Dec. 1974, p. 1661-1701.

Suess, M. et al., "A Novel High Resolution, Wide Swath SAR System", Geoscience and Remote Sensing Symposium, 2001. IGARSS 2001. IEEE 2001 Internationai, vol. 3, 2001, p. 1013-1015 vol. 3.

(56) References Cited

OTHER PUBLICATIONS

Tomkins, et al., A Zero-IF 60 GHz 65 nm CMOS Transceiver With Direct BPSK Modulation Demonstrating up to 6 GB/s Data Rates Over a 2 m Wireless Link, IEEE Journal of Solid-State Circuits, vol. 44, No. 8, Aug. 2009, 15 pages.

Viegas, et al., Millimeter Wave Radiometers for Applications in Imaging and Nondestructive Testing, 2015 8th UK, Europe, China Millimeter Waves and THz Technology Workshop (UCMMT), Sep. 2015, 4 pages.

Visser, Hubregt J. , "Array and Phased Array Antenna Basics", Wiley, Sep. 2005.

Vogel, Curtis R. , "Computational Methods for Inverse Problems", Society for Industrial and Applied Mathematics, Philadelphia, Jun. 2002.

Vu, et al., An Impulse Response Function for Evaluation of UWB SAR Imaging, IEEE Transactions on Signal Processing, vol. 58, No. 7, Jul. 2010, 6 pages.

Wang, Wen-Qin , "MIMO SAR Imaging: Potential and Challenges", IEEE Aerospace and Electronic Systems Magazine, vol. 28, No. 8, Aug. 2013, p. 18-23.

Watts, et al., 2D and 3D Millimeter-Wave Synthetic Aperture Radar Imaging on a PR2 Platform, IEEE/RSJ International Conference on Intelligent Robots and Systems, Oct. 2016, 7 pages.

Watts, et al., X-band SAR imaging with a liquid-crystal-based dynamic metasurface antenna, Journal of the Optical Society of America B, vol. 34, No. 2, Feb. 2017.

Werninghaus, Rolf et al., "The Terrasar-X Mission and System Design", IEEE Transactions on Geoscience and Remote Sensing, vol. 48, No. 2, Feb. 2010, p. 606-614.

Wolfe, et al., Digital Phase Shifter Elements for a K1-Band Phased Array Radar, MTT-S International Microwave Symposium Digest, vol. 76, Jun. 1976, p. 347-350.

Wu, K. et al., "Coherent Sub Aperture Processing Techniques for Synthetic Aperture Radar", Department of Communications, Canada: Communications Research Centre, Jan. 1984.

Yurduseven, et al., Comparison of Different Reconstruction Algorithms for Image Reconstruction in Metamaterial Aperture Based Imaging System, 2015 9th European Conference on Antennas and Propagation (EuCAP), Apr. 2015, 5 pages.

Yurduseven, et al., Frequency-diverse microwave imaging using planar Mills-Cross cavity apertures, Optics Express, Apr. 2016.

Yurduseven, et al., Multistatic microwave imaging with arrays of planar cavities, IET Microwaves, Antennas, & Propagation, Apr. 2016, 8 pages.

Yurduseven, et al., Printed Aperiodic Cavity for Computational and Microwave Imaging, IEEE Microwave and Wireless Components Letters, vol. 26, No. 5, May 2016.

Yurduseven, et al., Resolution of the Frequency Diverse Metamaterial Aperture Imager, Progress in Electromagnetics Research, vol. 150, Jan. 2015, 11 pages.

Zhang, et al., A Robust Reweighted L1-Minimization Imaging Algorithm for Passive Millimeter Wave SAIR in Near Field, Sensors, Sep. 2015, 16 pages.

"Self-Jamming Mitigation Via Coding for Millimeter-Wave Imaging With Direct Conversion Receivers", IEEE Microwave and Wireless Components Letters, vol. 2 Issue 4, Apr. 2017, pp. 410-412.

International Search Report and Written Opinion dated Sep. 10, 2018 for PCT Application No. PCT/US2017/065435, 20 pages.

PCT Application No. PCT/US2017/046337, titled "Millimeter Wave Imaging Systems and Methods Using Direct Conversion Receivers and/or Modulation Techniques" filed Feb. 5, 2019.

PCT Application No. PCT/US2017/065435, entitled 'Millimeter Wave and/or Microwave Imaging Systems and Methods Including Examples of Partioned Inverse and Enhanced Resolution Modes and Imaging Devices', filed on Dec. 8, 2017.

Devadithya, , "Computational Imaging for Dynamic Metasurface Based Synthetic Aperture Radars"; Thesis Master of Science in Electrical Engineering, University of Washington (Aug. 2017); 73 pgs.

Tomkins, Alexander et al., "A zero-IF 60 GHz 65 nm CMOS transceiver with direct BPSK modulation demonstrating up to 6 GB/s data rates over a 2 m wireless link." IEEE Journal of Solid-State Circuits 44.8 (*/2009): 2085-2099.

\* cited by examiner

MILLIMETER WAVE AND/OR MICROWAVE IMAGING SYSTEMS AND METHODS INCLUDING EXAMPLES OF PARTITIONED INVERSE AND ENHANCED RESOLUTION MODES AND IMAGING DEVICES

CROSS-REFERENCE TO RELATED APPLICATION(S)

This application is a 351 U.S.C. § 371 National Stage Application of PCT Application No. PCT/US2017/065435, filed Dec. 8, 2017, which claims the benefit under 35 U.S.C. § 119 of the earlier filing date of U.S. Provisional Application Ser. No. 62/431,754 filed Dec. 8, 2016, and U.S. Provisional Application Ser. No. 62/432,307 filed Dec. 9, 2016, and U.S. Provisional Application Ser. No. 62/432,375 filed Dec. 9, 2016, the entire contents of which are hereby incorporated by reference, in their entirety, for any purposes.

STATEMENT REGARDING RESEARCH & DEVELOPMENT

This invention was made with government support under Grant No. HSHQDC-12-C-00049, awarded by the Department of Homeland Security and Grant No. 15-USG-1064 MOD03, awarded by the National Reconnaissance Office. The government has certain rights in the invention.

TECHNICAL FIELD

Examples described herein relate to millimeter-wave and/or microwave imaging systems and methods.

BACKGROUND

Millimeter-wave (mmW) and/or microwave imaging has a variety of applications, such as security screening, through-wall sensing and imaging, nondestructive test and evaluation, production quality monitoring, and making images of the environment and man-made objects from a moving platform such as a vehicle, robot, aircraft or spacecraft. Additional applications include inspecting packaged goods or parcels, or determining the occupancy of a particular region of space proximate to a vehicle, robot, aircraft, or spacecraft.

In active mmW and/or microwave imaging, the region of interest (ROI) in a scene is illuminated by one or more transmitters, while the scattered energy from the scene is spatially sampled by one or more antennas and receivers. Many active imagers leverage mechanical motion of an antenna array to form a synthetic aperture radar (SAR) image. Other active imagers use phased arrays such as passive electronically scanned arrays (PESAs) or active electronically scanned arrays (AESAs). Phased arrays exploit a large number of antenna elements to form a large, spatially sampled aperture. Other imagers use a sparse array of transmitters and receivers to form a sampled aperture. In some imagers, such a sampled aperture may be stationary with respect to the scene. Further imagers use a multiple input multiple output (MIMO) architecture comprising transmitters and receivers spatially distributed to form a sampled aperture.

SAR imaging was originally developed for reconnaissance and military use. In stripmap mode SAR, a vehicle-borne, robot-borne, airborne, or space-borne radar platform generally moves along a trajectory while gathering measurements from a strip on the ground. The received signals are typically processed using 2-D correlation algorithms. Other SAR applications include radar imaging applications involving earth monitoring, remote sensing, surveillance, and security. SAR sensors may be used, for example, to map the surface of planets and moons and monitoring for geological changes, but also for reconnaissance operations. An advantage of radio frequency (RF) based imaging sensors is that they are equipped with their own illumination source, which makes them able to image day or night and independent of weather. However, compared to optical systems, SAR sensors often exhibit lower image resolution due to their much longer wavelengths.

In general, SAR reconstruction algorithms can be classified into inverse filtering and migration methods, Migration methods approximate the inverse by using the adjoint (e.g. matched filter), while inverse filtering methods explicitly find the inversion of the SAR forward model (e.g. a least squares solution). Generally, migration methods are more stable and robust to noise compared to inverse filtering, but the latter has improved resolution.

While some examples of sampled apertures may be used to generate SAR images, other examples of sampled and/or sparse apertures may not exploit physical motion of the antenna(s) or antenna army relative to the scene. In such examples, a number of antennas may be distributed in an environment, each antenna making a measurement of the scene from a different location relative to the scene. Images may be reconstructed from the measurements captured by the sampled and/or sparse aperture using inverse filtering and/or migration methods, such as those described herein. In some examples, the inputs to the reconstruction may include the location of each transmitter and receiver, as well as a measurement of the scattering from the scene such as a transfer function or impulse response. In some examples, a measurement may be performed using only a single frequency or a single narrowband signal when sufficient pairs of transmitters and receivers are used to provide acceptable image quality. In many cases, transmitters and receivers may share a common antenna, which may be referred to as a monostatic antenna configuration, or they may have separate antennas. The latter configuration may be referred to as a bistatic antenna configuration.

SUMMARY

Examples described herein include methods of image reconstruction. An example method may include receiving scattered signals from a scene. The scattered signals may be responsive to interrogation of the scene. The scattered signals may be received by an antenna system including at least one antenna. The scattered signals may be received at multiple relative positions between the at least one antenna and the scene. The method may further include constructing and inverting a measurement matrix based on signals received responsive to interrogation at a first relative position. The method may further include calculating multiple estimates of reflectivity values of the scene, each of the multiple estimates corresponding to a particular relative position of the at least one antenna, and each of the multiple estimates being calculated using the measurement matrix. The method may further include combining the multiple estimates of the reflectivity values to generate total reflectivity values for the scene. The method may further include generating image data based on the total reflectivity values.

In some examples, the calculating may include calculating at least a portion of the multiple estimates of reflectivity values in parallel. In some examples, the method may include assigning respective ones of the multiple estimates to respective cores of a graphics processing unit (GPU) for parallel processing.

In some examples, constructing and inverting may be implemented using matched filtering, inverse filtering, pseudo inverse filtering, or combinations thereof. In some examples, constructing and inverting may include using pseudo inverse filtering, and the method may further include regularizing the measurement matrix using truncated singular value decomposition. In some examples, the method may include determining a truncation value, including applying at least one of an unbiased predictive risk estimator, a discrepancy principle, a generalized cross validation, or an L-curve method.

In some examples, combining may include summing or weighted summing.

In some examples, the method may include moving the antenna system relative to the scene in a raster-scan pattern.

In some examples, the method may include moving the antenna system relative to the scene in a linear motion.

In some examples, the method may include moving the antenna system relative to the scene in a free-form motion, and determining the relative position of the antenna system with respect to the scene using a relative position sensor.

In some examples, calculating multiple estimates of reflectivity values may utilize respective weighted matrices to reorder the reflectivity values in accordance with the scene.

In some examples, each of the multiple estimates may be calculated only for portions of the scene within a predetermined beam-width of the at least one antenna.

In some examples, the portions of the scene may be determined separately for each of the multiple relative positions between the at least one antenna and the scene.

In some examples, generating image data based on the reflectivity values may include generating 2D pixel data, 3D voxel data, or combinations thereof, corresponding to the reflectivity values.

In some examples, each of the at least one antennas of the antenna system may be mechanically coupled to each other, and the method may further include physically moving the antenna system relative to the scene to provide the multiple relative positions.

In some examples, each of the at least one antennas may be stationary with respect to the scene, and each of the at least one antennas may be located at a different position relative to the scene.

In some examples, receiving scattered signals from a scene may include storing numeric values corresponding to the scattered signals in a memory or storage buffer.

In some examples, calculating multiple estimates of reflectivity values of the scene may be performed at least in part by assigning the numeric values from the buffer to each of the multiple estimates using an allocation matrix.

Examples of imaging systems are described herein. An example imaging system may include an antenna system configured to move a plurality of radiating elements through a plurality of measurement positions. The imaging system may include a controller coupled to the antenna system, the controller configured, at each measurement position, to cause the plurality of radiating elements to steer multiple beams of orthogonal signals toward a scene at different angles. The imaging system may include a receiver configured to receive energy from scattered signals resulting in part from scattering of the multiple beams of orthogonal signals from the scene. The imaging system may include an imaging device coupled to the receiver and configured to provide image data associated with the scene based on the energy from the scattered signals.

In some examples, the antenna system may include a motor or actuator configured to move the antenna system.

In some examples, the controller may be configured to steer at least some of the multiple beams of orthogonal signals toward the scene at different angles to sub-sample a total beamwidth of the scene utilizing multiple beams of orthogonal signals having respective beamwidths less than the total beamwidth.

In some examples, the controller may be configured, at each measurement position, to cause the plurality of radiating elements to steer multiple beams of orthogonal signals toward the scene at different angles and prior to arrival of the antenna system at a next measurement position.

In some examples, the multiple beams of orthogonal signals may be provided at different times.

In some examples, the plurality of radiating elements may include sub-wavelength elements of a dynamic antenna system. In some examples, the dynamic antenna system may be implemented using a dynamic metasurface antenna. In some examples, the plurality of radiating elements may include liquid-crystal switched radiating elements, semiconductor-switched radiating elements, radiating elements having a voltage-tunable dielectric substrate, or combinations thereof. In some examples, the sub-wavelength elements may be coupled to a transmission line, and the controller may be configured to cause the plurality of radiating elements to steer the multiple beams of orthogonal signals at least in part by adjusting at least one input signal to the transmission line. The at least one input signal may have a frequency range from DC to a frequency less than the frequency of the multiple beams of orthogonal signals. In some examples, the sub-wavelength elements may be coupled to a cavity, and the controller may be configured to cause the plurality of radiating elements to steer the multiple beams of orthogonal signals at least in part by adjusting at least one input signal to the cavity, the at least one input signal having a frequency range from DC to a frequency less than the frequency of the multiple beams of orthogonal signals.

In some examples, wherein the dynamic antenna may include the sub-wavelength elements coupled to a transmission line, and the controller may be configured to cause the plurality of radiating elements to steer the multiple beams of orthogonal signals at least in part by adjusting a frequency of at least one of the multiple beams of orthogonal signals. In some examples, the dynamic antenna may include the sub-wavelength elements coupled to a cavity, and wherein the controller is configured to cause the plurality of radiating elements to steer the multiple beams of orthogonal signals at least in part by adjusting a frequency of at least one of the multiple beams of orthogonal signals.

In some examples, the controller may be configured to provide time division multiplexing at least in part by controlling the plurality of radiating elements to emit each of the multiple beams of orthogonal signals at a different time. In some examples, the controller may be configured to provide frequency division multiplexing at least in part by controlling the plurality of radiating elements to emit each of the multiple beams of orthogonal signals at a different frequency. In some examples, the controller may be configured to provide code division multiplexing at least in part by controlling the plurality of radiating elements to emit each of the multiple beams of orthogonal signals using a different code sequence.

In some examples, the controller may be configured to steer the multiple beams of orthogonal signals in a stripmap mode or a spotlight mode relative to the scene.

In some examples, the imaging device may be configured to utilize partitioned inverse techniques to provide the image data. In some examples, the partitioned inverse techniques utilize a measurement matrix partitioned in accordance with the multiple beams of orthogonal signals.

DETAILED DESCRIPTION

Certain details are set forth below to provide a sufficient understanding of described embodiments. However, it will be clear to one skilled in the art that embodiments may be practiced without various of these particular details. In some instances, well-known circuits, control signals, timing protocols, and/or software operations have not been shown in detail in order to avoid unnecessarily obscuring the described embodiments.

Synthetic aperture radar (SAR) images generally refer to representations of microwave or millimeter-wave reflectivity of the observed scenes. SAR image reconstruction is an inverse problem, which can be solved via an approximation, e.g. matched filter (MF), or the explicit inverse using a large amount of measurement data. However, the approximation limits the resolution while the explicit inverse is generally computationally complex and mostly ill-conditioned. Examples described herein describe a partitioned inverse (PI) approach. In examples described herein, the construction and inversion of a measurement matrix used in image reconstruction may be partitioned to facilitate the described computations. Examples may utilize pseudo inverse techniques e.g., the Moore-Penrose pseudo inverse) using truncated singular value decomposition for regularization, in some examples, which may be robust to noise.

When applying inverse filtering to SAR imaging, some challenges arise: inverse filtering is computationally costly in both memory and time, and the problem is often ill-posed. Examples described herein may reduce the memory requirement of inverse filtering by partitioning the system model, solving the inverse for each part separately, and coherently integrating (e.g. combining) the solutions to reconstruct the final image. This so called partitioned inverse (PI) also allows for parallel processing, which may advantageously be assigned to parallel processing units such as pipelined graphics processing units (GPUs) or multicore GPUs or multicore central processing units (CPUs). Truncated singular value decomposition (TSVD) and L-curves may be used to regularize the partitioned sub-problems and to find an optimal truncation point in some examples.

Figure 1:
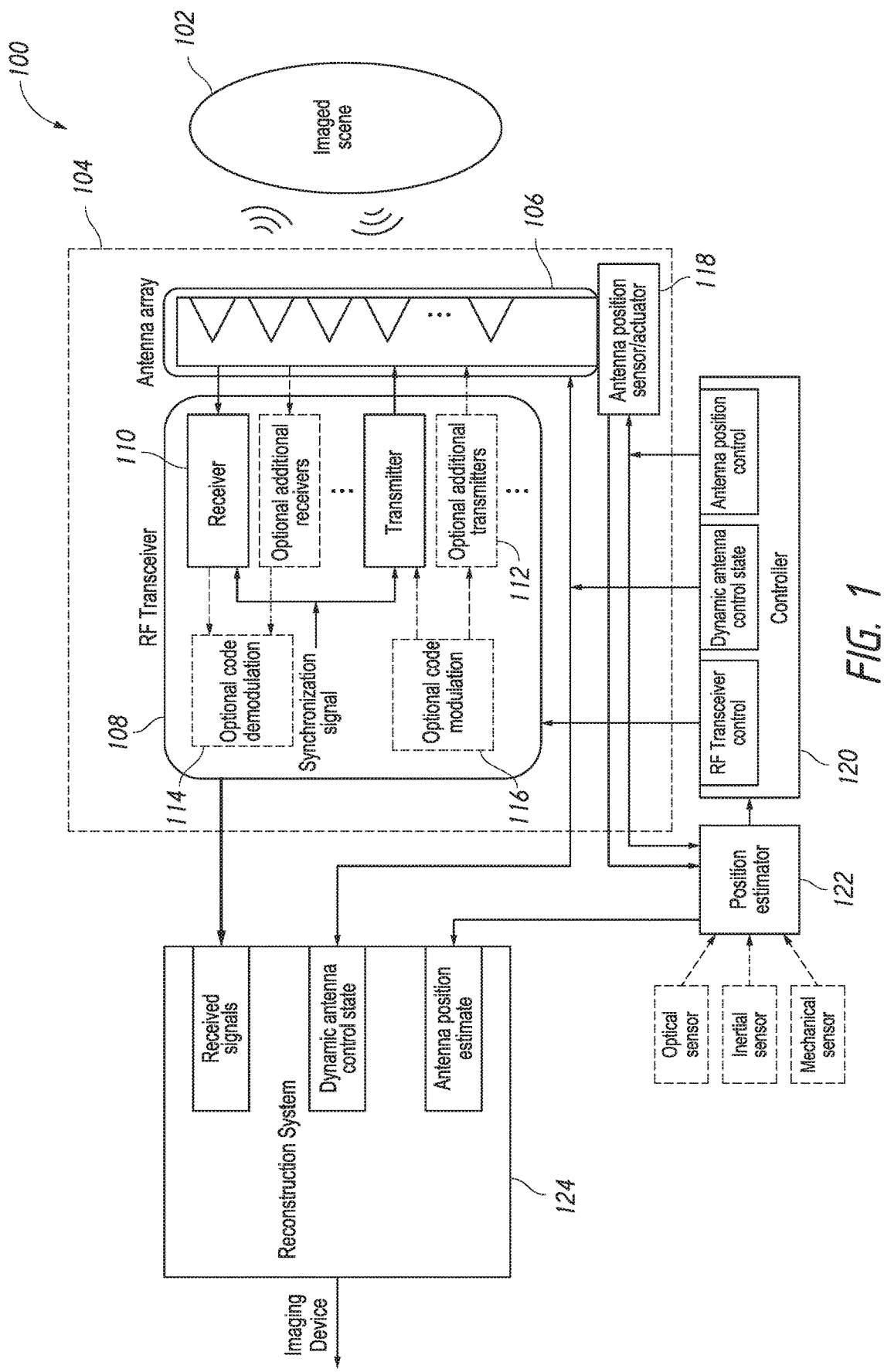
FIG. 1 is a schematic illustration of a system arranged in accordance with examples described herein.

FIG. 1 is a schematic illustration of a system arranged in accordance with examples described herein. System 100 an imaging system) includes antenna system 104, controller 120, position estimator 122, and reconstruction system 124. The system 100 is positioned to image a scene 102, The antenna system 104 includes antennas 106, position sensor/actuator 118, and RE transceiver 108. The RF transceiver 108 includes receiver 110, transmitter 112, demodulator 114, and modulator 116. The antennas 106 may be positioned to provide one or more interrogation signals to the scene 102 and receive scattered signals from the scene 102. The RF transceiver 108 may be coupled to the antennas 106 to provide the interrogation signals and/or receive the scattered signals. The controller 120 may be coupled to the position sensor/actuator 118 and may control movement of the antennas 106 relative to the scene 102. The position estimator 122 may be coupled to the controller 120 and/or position sensor/actuator 118 and may estimate a position of the antennas 106, which may be a relative position with respect to scene 102. The reconstruction system 124 may be coupled to RE transceiver 108 and/or position estimator 122 and/or antennas 106. The reconstruction system 124 may generate reflectivity values representative of scene 102 based on the interrogation signal, scattered signals, and/or antenna positions. The reflectivity values may be provided to an imaging device for generation of an image of the scene 102 based on the reflectivity values.

The antenna system 104 may be positioned to interrogate the scene 102. Generally, any of a variety of scenes may be imaged using techniques described herein. Examples of scenes include, for example, environments including people, objects, animals, signs, and/or buildings. Examples of antenna systems described herein may interrogate a scene using microwave and/or millimeter-wave signals. Examples include microwave and millimeter-wave radio frequency (RE) signals. Generally, a millimeter-wave RF signal may refer to a signal having a frequency between 15-26.5 gigahertz (GHz) (e.g., in the K-band), between 30 to 300 GHz, e.g., in the extremely high frequency (EHF) band. In some examples, a microwave signal may refer to a signal having a frequency between approximately 1 GHz and 15 GHz. In some examples, the signal may have a frequency between 17 to 300 gigahertz (GHz). In some examples, the signal may have a frequency between 10 to 300 gigahertz (GHz). A millimeter-wave RF signal may have a wavelength from approximately 1 to 10 mm, while a microwave RF signal may have a wavelength from approximately 2 cm to 30 cm. Signals having wavelengths on the order of millimeters (e.g., between approximately 1 and 10 mm) may advantageously be used as described herein to generate image data associated with a scene. The millimeter-wave and/or microwave signals may penetrate organic materials (e.g., clothing) but may not very deeply penetrate into biological tissue (e.g., typically less than 1 mm penetration), and accordingly may safely be used to generate images of subjects for security purposes in some examples.

The antenna system 104 may include antennas 106. Any number of antennas may be used, including 1, 2, 3, 4, 5, 6, 7, 8, 9, 10, 16, 32, 64, 128, or another number of antennas. The antennas 106 may be implemented using a single antenna, a transmit-receive antenna pair, an array of antennas, or more complex antennas including sub-elements, such as metamaterial antennas or dynamically reconfigurable antennas. The antennas may be arranged spatially in any manner, including in one or more linear arrays (e.g., lines), or in a two- or three-dimensional configuration. Such a two- or three-dimensional configuration may be arranged in a regular grid, or alternatively in an irregular grid. When either a linear array or a two- or three-dimensional configuration is used, an irregular spacing between antennas may advantageously reduce the visible artifacts in the image due to aliasing in the spatial sampling of the scene.

The antennas 106 may, during operation, move relative to the scene 102.

Accordingly, in some examples, the scene 102 may be moving relative to antennas 106, which may be stationary. In some examples, the antennas 106 may be moving relative to the scene 102, which may be stationary. In some examples, both the antennas 106 and the scene 102 may be moving, and there may be relative motion between the two. The antennas 106 may be moved in generally any manner as described herein. In some examples, the antennas 106 may be moved in a raster-scan pattern (e.g., along one or more horizontal and/or vertical lines relative to the scene 102). In some examples, the antennas 106 may be moved in a linear pattern (e.g., along one or more straight lines). In some examples, the antennas 106 may be moved in a free-from manner (e.g., moved randomly or freely relative to scene 102). For example, the antennas 106 may in some examples be packaged in a manner allowing for the antennas 106 to be held by a user, and the user may move the antennas 106 relative to the scene 102 (e.g., the user may manually "wand" the scene 102 with the antennas 106). In some examples, a robot, a ground or air vehicle, or another mechanical system such as a conveyor belt may move the antennas 106 relative to the scene 102. In this manner, the antenna system 104 may interrogate the scene 102 (e.g., provide interrogation signals) at multiple relative positions between the antennas 106 and the scene 102. Examples of imaging systems described herein may implement synthetic aperture radar (SAR).

In some examples, a number of antennas 106 may be packaged into a form factor such as a sensor bar with a handle affixed. In some examples, a number of antennas may be disposed in a line along the long axis of the sensor bar. In other examples, the antennas may be disposed in multiple parallel lines forming a square grid of antennas, while in other examples, the antennas may be disposed in an interleaved pattern akin to a checkerboard. In such examples, an inertial measurement unit or a position sensor such as an optical position sensor may be used to estimate the position of the antennas relative to the scene 102. In other examples, a mechanical position sensor such as a pantograph arm with potentiometers or rotary encoders at its joints may be used to estimate the position of the antennas relative to an attachment point, wherein the attachment point is fixed relative to the scene.

Generally, a raster scan pattern may be used in some examples where motion may be supplied by machinery (e.g., a robot, a conveyor belt and/or a positioning stage). In some examples (e.g., using a conveyor belt) continuous motion may be provided in one axis, and discrete sampling may be performed on another axis using a number of antennas.

In some examples having approximately continuous motion, such objects carried by a conveyor belt, a constant velocity of relative motion between an object and one or more antennas affixed proximate to the conveyor belt may be assumed. In such examples, a sensor such as a break-beam or other proximity sensor may be used to detect an object at a position along an axis, and this may be used to start a timer to begin acquiring time-stamped measurements of the scene containing the object as it moves relative to a number of antennas. In other examples, a detector of rotary motion such as an odometer wheel, a rotary encoder, a shaft encoder, or other such sensor may be used to measure the relative position of the object, or a surface carrying the object, such as a conveyor belt. In such examples, the measurements of relative position may be synchronized with the measurements made by the antennas and these sets of information may be used together by a subsequent image reconstruction.

In some examples, one or more antennas may be affixed proximate to a railroad, a roadway, a bicycle trail, a tramway, or another path where an object, including but not limited to persons, robots, or vehicles, move past. In such examples, one or more antennas may be mounted proximate to the path and such antennas may make measurements which include the scattering from the object. In some examples, a break-beam sensor or another proximity sensor may be used to detect the object at a particular position, and this may be used to stark a tinier to begin acquiring time-stamped measurements of the scattering from the scene containing the object. In such examples, the measurements of relative position may be synchronized with the measurements made by the antennas and these sets of information may be used together by a subsequent image reconstruction.

In some examples, a raster scan of the antennas 106 may be performed which may fill in a sub-wavelength grid of measurements (e.g., with grid spacing smaller than the imaging resolution)—this may generate a full spatial Nyquist sampling of the scene and may preserve optimal image resolution in some examples. Such a complete raster scan may be time consuming and may utilize undesirably precise mechanical positioning of the antenna array. A sub-sampling approach, e.g. at random or other selected positions, may be more practical in some examples. The sub-sampling approach may involve a trade-off between image quality and measurement time.

In some examples, mechanical motion of antennas may not be used. In some examples, antennas may be provided at different positions (e.g. to cover a wall or other surface), and techniques described herein may be utilized to reconstruct images in view of of (1) measurement data (e.g., scattered signals received from the scene) and (2) the receiving antenna and transmitting antenna positions at which the measurement was made. Measurements may be obtained at different relative positions by utilizing different antennas, for example. If the scene is static (or quasi-static), then measurements may be taken in some examples in any sequence with a resulting same reconstructed image.

In some examples, antennas used herein may be stationary, and the scene may move relative to the antennas. This approach may be referred to as inverse synthetic aperture radar (ISAR). In some examples, a combination of approaches may be used, where a number of antennas e.g., 6 antennas) may be mounted together in an assembly (e.g., a sensor bar). A user may move the sensor bar in a pattern e.g., a raster pattern, a linear pattern, and/or a free-form pattern) to scan a scene. In some examples, the sensor bar may be fixed and the scene may move (e.g., objects may move along a conveyor belt and/or may move past a sensor bar by walking or otherwise moving relative to the sensor bar). In some examples, systems described herein may provide an indicator when a sufficient number of measurements have been collected to image the scene, or image the scene with a particular resolution. The indicator may be provided, for example, by imaging systems described herein. A visual, tactile, auditory, or other indicator may be provided on the sensor bar or on a display coupled to the imaging device and in communication range of a user.

The antenna system 104 may include position sensor/actuator 118. The position sensor/actuator 118 may provide one or more actuators which may move the antennas 106 relative to the scene. The position sensor/actuator 118 may include one or more sensors which may sense a position of the antennas 106 (e.g., an absolute position and/or a relative position with respect to the scene 102).

The antenna system 104 may include RF transceiver 108. The RF transceiver 108 may be used to generate interrogation signals to be transmitted by the antennas 106. Any of a variety of interrogation signals may be used. In some examples, the interrogation signals may be narrow-band signals (e.g., may be approximated with one Fourier component in a frequency domain). In other examples, the interrogation signals may be wideband signals (e.g., signals including multiple Fourier components in a frequency domain), The RF transceiver 108 may be used to receive scattered signals incident on the antennas 106. The RF transceiver 108 may accordingly include any number of transmitters, such as transmitter 112. In some examples, one transmitter may be used to provide interrogation signals to one or more antennas. In some examples, multiple transmitters may be provided. Each transmitter may provide interrogation signals to one or more antennas. The RF transceiver 108 may include any number of receivers, such as receiver 110. In some examples, one receiver may be used to receive (e.g., demodulate and/or decode) scattered signals from one or more antennas. In some examples, multiple receivers may be provided. The receivers may store numeric values corresponding to the scattered signals in a memory or storage buffer. Each receiver may be used to receive scattered signals incident on one or more antennas.

The RF transceiver 108 may in some examples utilize a synchronization signal to synchronize the signals used at transmit and receive operations. For example, the interrogation signal produced by the transmitter may be synchronized with the signal used in the receiver to downconvert and/or sample the received signal to allow phase-coherent signal detection.

The RF transceiver 108 may in some examples utilize a control signal from an RF transceiver control device in the controller 120 to control the transmit and receive operations. For example, one or more antennas may be used to both transmit and receive. The control signal may be provided to one or more transmitters and/or receivers to indicate whether transmission or receiving is desired at a particular time. For example, a receiver coupled to an antenna may be activated during a time of desired receiving while a transmitter coupled to the same antenna may be de-activated during that time period. In some examples, different antennas may be used to transmit and receive. The control signal may be provided to one or more transmitters and/or receivers to indicate whether transmission or receiving is desired at a particular time. For example, a receiver coupled to an antenna intended for use as a receive antenna may be activated during a time period of desired receiving. A transmitter coupled to an antenna intended for use as a transmit antenna may be de-activated during the time period of desired receiving.

The RF transceiver 108 may in some examples include a demodulator 114 and/or modulator 116. In some examples, modulation of interrogation signals may be used (e.g., amplitude and/or phase modulation, or complex modulation schemes such as quadrature amplitude modulation (QAM) or orthogonal frequency division multiplexing (OFDM)). The modulator 116 may provide the desired modulation such that the antennas 106 may interrogate the scene 102 with a modulated signal. The demodulator 114 may provide the desired demodulation such that scattered signals received by the scene 102 may be demodulated.

Examples of imaging systems described herein, such as system 100, may include one or more controllers for controlling the antennas and/or antenna systems. Controller 120 is depicted in FIG. 1, The controller 120 is in communication (e.g., wired or wireless communication) with the position sensor/actuator 118 for controlling motion of antennas 106. In some examples, the antennas 106 and RF transceiver 108 may move together. In some examples, the antennas 106 may move independent of RF transceiver 108. The controller 120 may be implemented using, for example, one or more processing units (e.g., processors, microcontrollers, logic circuitry) and memory encoded with instructions which, when executed, cause the processing units to perform the actions described herein as being performed by the controller. One or more central processing units, microcontrollers, field programmable gate arrays (FPGAs) and/or application specific integrated circuits (ASICs) may for example be used to implement controller 120. The controller 120 may perform RF transceiver control, dynamic antenna control, and/or antenna position control, as shown in FIG. 1.

The dynamic antenna control signal may be used to control the configuration of the antenna system. Recall the antenna system may include a single antenna, a (sub)-group of antennas, an entire antenna array, or a plurality of different antenna elements. The dynamic antenna control signal may switch the antenna elements jointly or independently into different antenna modes such as transmit, receive, or inactive, by connecting different antenna elements to one or more transmitter(s) and/or receiver(s). In some embodiments, the dynamic antenna control signal may control single antenna or antenna array parameters such as antenna polarization, center frequency, bandwidth, antenna beam direction, or different beam patterns (e.g. chaotic radiation modes, pseudo-random radiation modes, frequency diverse radiation modes, etc.). The dynamic antenna control signal may select single input single output (SISO), single input multiple output (SIMO), multiple input single output (MISO), or multiple input multiple output (MIMO) modes of operation among the transmitter(s) and receiver(s).

Examples of imaging systems described herein, such as system 100 of FIG. 1, may include one or more position estimators, such as position estimator 122. The position estimator 122 may be used to estimate the position of the antenna system relative to the scene. The position estimator 122 may be implemented using, for example, one or more processing units (e.g., processors, microcontrollers, logic circuitry) and memory encoded with instructions which, when executed, cause the processing units to perform the actions described herein as being performed by the position estimator. One or more central processing units, microcontrollers, field programmable gate arrays (FPGAs) and/or application specific integrated circuits (ASICs) may for example be used to implement position estimator 122.

The position estimator 122 may receive data from the position sensor/actuator 118 and/or antennas 106. In some examples, the position estimator may receive data from other sensors in the system 100 which may include, for example, an optical sensor, an inertial sensor, a mechanical sensor, or combinations thereof. Accordingly, a variety of position sensors may be utilized by the position estimator 122, including feedback from position sensor/actuator 118 which may be moving the antennas 106 (e.g. stepper motor position output, rotary encoder output, linear encoder output, etc.), optical sensors (such as laser distance measurement or camera systems), inertial sensors (such as gyroscopes and/or accelerometers), or mechanical sensors (such as wire-actuated encoders, string-potentiometers, and/or ultrasound distance measurement). In some examples, multiple sensors of the same type may be combined, as in the use of a stereo camera pair to allow 3D position measurement. In other examples, it may be desirable to integrate sensors of different types to achieve the highest fidelity estimate of antenna system position, for example by using one or more accelerometers in combination with one or more optical cameras. In this example, periodic views of the scene using the optical camera(s) may be used to at least partially compensate for accumulated drift in the accelerometer reading(s). In some examples, periodic views of the scene using optical camera(s) may be used to determine that the antenna system is at least temporarily not moving relative to the scene, and to perform a zero-velocity update of an inertial measurement system.

The sensor data may be used by the position estimator 122 to estimate a position of one or more of the antennas 106. The position estimated may be an absolute position and/or a relative position with respect to the scene (e.g., scene 102). Kalman filtering methods may be used to incorporate data from multiple sensors to yield an estimate of antenna position. Accordingly, multiple sensors may be combined to form the position estimation system in combination with a technique, such as a Kalman filter, to use noisy measured position sensor outputs to jointly estimate the antenna position. A technique such as a Kalman filter has the advantage of optimally estimating the antenna system position by updating the position estimate given the noise covariance of the position sensor outputs.

In some embodiments, a fiducial may be introduced into the scene, or disposed proximate to the scene, to facilitate antenna system position estimation. Such a fiducial may take the form of either a permanently installed object having known features, or a temporarily installed object having known features. One example of a fiducial is a self-adhesive sticker bearing one or more alignment marks, or an optical code such as a checkerboard or QR code, that may be placed on a surface either within or proximate to the scene. In this example, at least one fiducial may be adhered to a surface in or proximate to a scene by a user, for example by the user manually sticking the fiducial sticker to a wall surface. Then, at least one camera mechanically affixed to the antenna system may be used to observe the fiducial(s). In some embodiments, multiple such fiducials affixed to a surface in, or proximate to, the scene may be observed by three cameras affixed to an antenna to enable the position estimation system to estimate the 3D relative position of the antenna system relative to the scene.

Examples of imaging systems described herein, such as system 100 of FIG. 1 may include a reconstruction system, such as reconstruction system 124. Generally, the reconstruction system 124 may operate to estimate one or more reflectivity values associated with the scene 102. The reconstruction system 124 may be implemented using, for example, one or more processing units (e.g., processors, microcontrollers, logic circuitry) and memory encoded with instructions which, when executed, cause the processing units to perform the actions described herein as being performed by the reconstruction system. One or more central processing units (CPUs) and/or graphics processing units (GPUs), microcontrollers, field programmable gate arrays (FPGAs) and/or application specific integrated circuits (ASICs) may for example be used to implement reconstruction system 124. The reconstruction system 124 may receive the received scattered signals from the RF transceiver 108, position estimates from position estimator 122, and/or dynamic antenna control states. The input information may be utilized by the reconstruction system 124 to estimate reflectivity values associate with scene 102.

Generally, examples of reconstruction systems described herein may construct and invert a measurement matrix. The measurement matrix may relate the reflectivity values of the scene to the measured scattered signals. The inverse measurement matrix may accordingly be used to estimate the reflectivity values based on measured scattered signals. As described herein, the constructing and inverting may include matched filtering, inverse filtering, pseudo inverse filtering, or combinations thereof. In some examples using pseudo inverse filtering, techniques described herein may regularize the measurement matrix using truncated singular value decomposition. In some examples, techniques described herein may determine a truncation value which may include applying at least one of an unbiased predictive risk estimator, a discrepancy principle, a generalized cross validation, or an L-curve method.

Note that the operations performed by the reconstruction system 124 may be computationally intensive. Accordingly, in some examples described herein, the reconstruction system 124 may utilize partitioning techniques to estimate reflectivity values in a computationally efficient manner. For example, the reconstruction system 124 may partition the construction and/or inversion of a measurement matrix using antenna position. In some examples, the measurement matrix may be constructed and/or inverted by the reconstruction system 124 using a model of the scattering from hypothetical scatterers at positions in the scene 102 where a reconstruction may be desired and which are responsive to interrogation of the scene 102 by the antennas 106 at a particular relative position. Generally, any relative position may be used, including a predetermined relative position, a starting relative position, an ending relative position, or another selected position in an illumination pattern of the antennas 106. As described herein, the measurement matrix calculated using scattered signals received from the scene 102 responsive to interrogation of the scene 102 by the antennas 106 at a particular relative position may be constant for multiple and/or all relative positions of the antennas 106 with respect to the scene 102. Accordingly, the same measurement matrix may be used to estimate reflectivity values associated with the scene using scattered signals responsive to interrogation of the scene 102 at other relative positions of the antennas 106 and scene 102. In this manner, one construction and inversion of the measurement matrix may be used to estimate reflectivity values at multiple relative positions. Further partitioning may be achieved in some examples by estimating reflectivity values only for portions of the scene within a predetermined beam-width of the antenna system. Accordingly, for each position of the antenna system an estimate of reflectivity values may be calculated for a portion of the scene within a particular beam-width of the interrogation signal provided by the antenna system 100 (e.g., within a half-power (3 dB) beamwidth, or a beamwidth defined with a different threshold in other examples). Reflectivity values associated with different portions of the scene may be calculated separately in some examples, and then combined as described herein.

The multiple estimates (e.g., estimates performed with scattered signals from multiple relative positions and/or estimates pertaining to certain portions of the scene) may be calculated at least partially in parallel in some examples, which may further allow for computational savings. In some examples, certain ones of the multiple estimates may be assigned to respective pipelines (e.g., cores) of a GPU for parallel calculation. In some examples, the multiple estimates may be manipulated using respective weighted matrices to reorder the reflectivity values in accordance with the scene. The multiple estimates may be combined to form total reflectivity values which may be used to generate image data described herein. The combination may, for example, be a sum or a weighted sum.

Examples of imaging systems described herein, such as system 100 of FIG. 1, may include an imaging device. Imaging devices described herein may utilize reflectivity values (e.g., reflectivity values provided by reconstruction system 124) to generate image data associated with a scene, such as scene 102. The image data may be used to display a representation of the scene 102 or objects in the scene 102. In some examples, the image data may pertain to display of objects which may not be visually observable in the scene 102. For example, as described herein, millimeter-wave and/or microwave interrogation signals may penetrate certain materials (e.g., clothing, drywall, paint). Accordingly, image data provided in examples described herein may pertain to objects which are concealed beneath those materials (e.g., weapons, coins, wood or metal studs or framing, wires, pipes, or other building materials). The image data may include 2D pixel data, 3D voxel data, or combinations thereof.

Examples described herein may utilize an enhanced resolution mode of imaging which may utilize multiple beam configurations at each measurement position—for example, beams may be steered to multiple angles to interrogate a portion of the scene at each measurement location.

Referring to FIG. 1, for example, the antennas 106 may be implemented using a plurality of radiating elements. For example, the antennas 106 may be implemented with one or more dynamic antenna systems, which may include one or more sub-wavelength elements (e.g., sub-wavelength radiating elements). In some examples, a dynamic metasurface antenna may be used, which may include multiple sub-wavelength elements. The plurality of radiating elements may be implemented using liquid-crystal switched radiating elements, semiconductor-switched radiating elements, radiating elements having a voltage-tunable dielectric substrate, or combinations thereof.

The controller 120, at each of a plurality of measurement positions of the antennas 106, may cause the antennas 106 to steer multiple beams of orthogonal signals toward the scene 102 at different angles. The antennas 106 may be steered in a stripmap mode and/or a spotlight mode. In the stripmap mode, generally beams may be directed along a pattern (e.g., a "strip") of a scene. In a spotlight mode, generally multiple beams may all be directed toward the same location of a scene. In some examples, the multiple beams of orthogonal signals may be selected to sub-sample a total beamwidth of the scene by utilizing beams with respective beamwidths less than the total beamwidth. In this manner, a response may be obtained from the measured signals indicative of the smaller beamwidth of the beams of orthogonal signals, which may improve a signal-to-noise ratio of the measurement. However, a combination of the responses received based on the multiple beams of orthogonal signals may approximate a response to the total beamwidth. This may allow for improved signal-to-noise ratio while maintaining a scene resolution commensurate with the total beamwidth. The sub-sampling of a total beamwidth using multiple beams of orthogonal signals may, for example, be performed by utilizing a first distribution of beams along a first axis and a second distribution of beams, at a right angle to the first distribution of beams, along the same first axis. Alternatively, the multiple beams with orthogonal signals which sub-sample a total beamwidth may be distributed in a circular configuration centered around the first axis.

In this manner, as the antennas 106 move relative to the scene 102, measurements may be taken at each of a plurality of measurement positions using multiple beams of orthogonal signals. In some examples, the antennas 106 may experience relative motion in a continuous pattern. In some examples, the antennas 106 may experience relative motion in a discontinuous pattern (e.g., discretely from one measurement position to another). In examples of discontinuous relative motion, the multiple beams of orthogonal signals may be provided while the antennas 106 are located at each measurement location. In examples utilizing a continuous pattern, the antennas 106 may be in slightly different relative positions when providing each of the multiple beams of orthogonal signals. Nonetheless, the relative position change between the times different ones of the multiple beams with orthogonal signals are provided may be small relative to the distance between measurement positions, accordingly, measurements taken as the antennas 106 are moving toward a next measurement position may be considered taken at the previous measurement position, or an average measurement position. Generally, the multiple beams of orthogonal signals may be provided to interrogate the scene prior to arrival of the antennas 106 and/or scene 102 at a next measurement location. Accordingly, the multiple beams of orthogonal signals may be provided at different times.

Providing multiple beams of orthogonal signals utilizing different beam angles may generally utilize a fast switching time between beams and/or angles. For example, radiating elements may quickly change their properties to achieve the beam patterns used in enhanced resolution modes described herein. Accordingly, dynamic antenna systems may advantageously be used, which may be able to provide adequately fast changes in beam configuration. In some examples, dynamic metasurface antennas may be used which include sub-wavelength elements coupled to a transmission line, waveguide, substrate-integrated waveguide (SIW), or cavity. The multiple beams of orthogonal signals may be generated by adjusting an input signal to the transmission line, waveguide, substrate-integrated waveguide (SIW), or cavity (e.g., utilizing controller 120). The input signal may be adjusted, for example, by varying a frequency of the input signal between a DC frequency and a frequency which is less than a frequency of the multiple beams of orthogonal signals. In some examples, the frequency of the multiple beams of orthogonal signals may accordingly be adjusted.

The multiple beams of orthogonal signals may be orthogonal in time, frequency, and/or code. For example, time division multiplexing of the multiple beams of orthogonal signals may be provided by controlling the antennas 106 (e.g., a plurality of radiating elements) to emit each of the multiple beams of orthogonal signals at a different time. Frequency division multiplexing may be provided by controlling the antennas 106 (e.g., a plurality of radiating elements) to emit each of the multiple beams of orthogonal signals at a different frequency, or with a modulation scheme such as orthogonal frequency division multiplexing (OFDM). Code division multiplexing may be provided by controlling the antennas 106 (e.g., a plurality of radiating elements) to emit each of the multiple beams of orthogonal signals utilizing a different code. Such a code may include an orthogonal code such as a Barker code, a pseudonoise (PN) code, or another sequence of modulation symbols that are orthogonally disposed. The controller 120 (e.g., using RF transceiver control) may provide the described control over the beams and over the orthogonal signals.

The RF transceiver 108 may receive scattered signals resulting from the scattering of the multiple beams of orthogonal signals from the scene, and the reconstruction system 124 and/or an imaging device may utilize the energy from the scattered signals to generate image data of the scene. In some examples, the reconstruction system 124 and/or the imaging device may utilize partitioned inverse techniques described herein to provide the image data. The partitioned inverse techniques may include utilizing a measurement matrix partitioned in accordance with the multiple beams of orthogonal signals.

Examples described herein accordingly provide image reconstruction (e.g., SAR image reconstruction) based on scattered signals from a scene responsive to interrogation by one or more interrogation signals, Images described herein may accordingly be considered representations of the complex radar reflectivity of scenes (e.g., scene 102 of FIG. 1). One or more antennas (e.g., antennas 106) may transmit interrogation signal(s) and/or receive scattered signals (e.g., backscattered energy) due to the illuminated point scatterers comprising the scene. For example, the scene may be considered to be (e.g., may be modeled as) a collection of point scatterers. This yields a position-dependent scene transfer function. Interrogation signals described herein may be single frequency, narrow-band, wideband, or ultra-wideband waveforms in some examples, and the ground-range resolution may be inversely proportional to the bandwidth. The cross-range (azimuth) resolution may be inversely proportional to the length of the synthetic aperture. Therefore, with relative motion between the scene and the interrogating antennas (e.g., as the antennas or scene move relative to each other transfer functions of the scene may be measured at different positions to create a large effective aperture. For example, at antenna positions $m \in \{1, \ldots, M\}$, the sampled frequency response vector $y_m$ may be measured. The antenna positions may refer, for example, to positions of the antennas 106 of FIG. 1, and the sampled frequency response vector $y_m$ may be measured using, for example receivers in RF transceiver 108 of FIG. 1. Assuming a scene consisting of N point scatterers, the received signal $y_{m,l}$, at the l-th frequency sample, where $l \in \{1, \ldots, L\}$, of the measurement vector $y_m$ may be written as:

$$y_{m,l} = \sum_{n=1}^{N} a_{m,l,n} e^{-j\omega_l t_{m,n}} x_n + v_{m,l}, \quad \text{Equation 1}$$

where is the complex reflection coefficient (e.g., the reflectivity value) of the n-th point scatterer, $a_{m,l,n}$ is the propagation channel including path loss and antenna response, cot is the angular frequency, is the round-trip time delay between antenna position m and the n-th point scatter, is measurement noise, and $j=\sqrt{-1}$. Concatenating all M measurements (at each of M positions) gives $y=Hx+v$, where y is a vector of measurements (e.g., measurements of scattered signals at M positions) $y=[y_1^T, \ldots, y_M^T]^T$, v is measurement noise, and x is a vector of reflectivity values of modeled point scatterers making up the scene, $x=[x_1, \ldots, x_N]^T$ is the reflectivity vector of the point scatterers, and $(.)^T$ is the transpose operator. The measurement matrix H provides a dependence between the reflectivity values of the point scatterers and each measurement. The elements of the measurement matrix are defined as $$[H]m(L-1)+l, n = a_{m,l,n} e^{-j\omega_l t_{m,n}}. \quad \text{Equation 2}$$

where in is the index of each position of the antennas, 1 is the index of the frequency component of the scattered signal (e.g., each frequency component index through L), $a_{m,l,n}$ is the propagation channel including path loss and antenna response, qui is the angular frequency, $t_{m,n}$ is the round-trip time delay between antenna position m and the n-th point scatter, $v_{m,l}$ is measurement noise, and $j=\sqrt{-1}$.

Image reconstruction described herein generally obtains an estimate of the reflectivity values from measurements of scattered signals by solving the inverse problem posed by $y=Hx+v$. However, H may not be a full rank matrix and may be non-invertible. Accordingly, approximations of the inverse are generally used. In some examples, matched filter approximations are used which may approximate the inverse using an adjoint operator. The matched filter estimate may be written as where $\hat{x}=H^*y$, where $(.)^*$ indicates a conjugate transpose operator. The matched filter approximations, however, may have limited resolution.

In some examples, a pseudo inverse approximation is used (e.g., a Moore-Penrose pseudo inverse). The Moore-Penrose pseudo inverse can be computed using singular value decomposition (SVD). The pseudo inverse may be written as $\hat{x}=H^{\dagger}y$, where $(.)^{\dagger}$ denotes the pseudo inverse. A bad condition number, indicating that there exist singular values that are small compared to the rest, may however cause the inverse to be unstable and the problem to be ill-conditioned. Furthermore, the computation of the pseudo inverse may be computationally complex. H gives the relationship between all the point scatterers and all the elements in the measurement vector. Thus, it may be a large matrix and computing the full inverse may utilize a lot of memory. In many cases this approach may be impractical given the hardware constraints of standard computing systems.

Accordingly, examples described herein may partition the system model. The partitioning may be two-fold: 1) partitioning of the measurement vector into sub-apertures $\{y_m\}$ by the antenna position, and 2) partitioning the reconstruction scene, as observed by the half-power (3 dB) beamwidth of the antenna, at each position. However, it should be appreciated that, as described herein, other thresholds for determining a beamwidth of the antenna may be used. For example, partitioning of the measurement vector into sub-apertures may generally refer to generating estimates of reflectivity values of the scene for each of multiple relative antenna positions independently. When generating reflectivity values for each of multiple resolutions, a same measurement matrix may be used (e.g., the measurement matrix may be constant). Partitioning the reconstruction scene as observed by the beamwidth of the antenna at each position generally may refer to estimating reflectivity values of only those point scatterers in the scene within a particular beamwidth of the antenna (e.g., within a 3 dB beamwidth). Note that contributions of point scatterers outside of the antenna beamwidth may not be considered in the forward model. Generally, the radiation pattern of the antenna may be considered a representation of how the energy from the transmitter is distributed over the scene. Since a practical antenna will not be truly isotropic, there may be more energy illuminating the scene in the direction the antenna is pointing, vs. outside the bore-sight of the antenna. Accordingly, a particular beamwidth may be selected as a benchmark—for example, the 3 dB beamwidth may represent that half of the illuminating energy is ending up in that region of space.

Computation time may be saved by focusing the reconstruction effort on the portion of the scene that is most strongly illuminated by the particular interrogation signals at a particular time. Note that this may provide model residuals, however the residuals may be tolerable and/or negligible. Accordingly, a possible partition of the scene may be described as a set of reflectivity values $\tilde{x}_m$:

$$\tilde{x}_m = [x_{m,1}, \ldots, x_{m,N'}]^T \qquad \text{Equation 3}$$

where N'«N is the number of point scatterers observed by the antenna at each position (e.g., the point scatterers within a particular beamwidth of the antenna, such as a 3 dB beamwidth). The partitioned system model is given as $$y_m = H_m \tilde{x}_m + v_m. \qquad \text{Equation 4}$$

$H_m$ is a measurement matrix which is an L×N' matrix, which is much smaller than the size of the original (ML)×N measurement matrix. Instead of obtaining the inverse of the full measurement matrix, examples described herein may compute the inverse of one or more sub-measurement matrices and solve for each sub-aperture separately.

Advantageously, the measurement matrix $H_m$ may be constant for all the partitions in, for example, a stripmap mode. Defining $H_m$ as the constant measurement matrix, $H_m = H_s \forall m \in \{1, \ldots, M\}$. As described herein, the variables in the measurement matrix include the frequencies $\{\omega_l\}$ and time delays $\{t_{m,n}\}$. The frequency samples remain the same for each system position, and by fixing the reconstruction scene for each position the time delays also remain constant. Therefore, construction of the measurement matrix and the inversion needs to be done only once, and may be used to generate estimates of reflectivity values at each system position. This advantageously may save significant memory and computation time.

As an explanation of why the measurement matrix can be considered constant across partitions, recall that the scene is considered to made of hypothesized point scatterers distributed equally on a grid in some examples. Accordingly, reconstructed images may include pixels and/or voxels with the same grid spacing as the hypothesized scatterers (e.g., reflectivity values of the scatterers may be used to generate pixel and/or voxel values).

The position of these pixels/voxels can be described in a global coordinate system of the final image. However, each partitioned reconstruction can also be considered to be performed in its own local coordinate system with the position of the antenna. (e.g. TX or RX) at its origin. In examples where the measurement position grid aligns with the pixel/voxel grid (e.g., a uniformly spaced raster-scan pattern), the local coordinate positions of the pixels/voxels within a selected (e.g. 3-dB) beamwidth of the antenna will align with the pixel/voxel positions in the global coordinate system. Also, the relative position of pixels/voxels in the local coordinate system do not change from one measurement position to another. Although the reflectivity value of these pixels/voxels might be different at the end, their relative position in the local coordinate system is the same. Accordingly, the same measurement matrix (e.g., sub-measurement matrix $H_s$) may be used for each partition in the reconstruction.

In some examples, the measurement positions may not align with the pixel/voxel grid. Accordingly, each partitioned reconstruction may reconstruct pixels/voxels which are not aligned with this grid. Accordingly, interpolation may be used in some examples to enforce a realignment at the summing stage of the partitioned inverse reconstruction. This may accommodate a measurement strategy that attempts to preserve as much image resolution as possible with the fewest number of measurements.

Defining $H_s$ as the constant measurement matrix (e.g., sub-measurement matrix), Equation 4 may be expressed as:

$$y_m = H_s \tilde{x}_m + v_m. \qquad \text{Equation 5}$$

Solving the inversion problem gives the estimated solution (e.g., estimated reflectivity values) for each partition, which may be found using matched filter or pseudo inverse techniques. For most cases $H_s$ may be ill-conditioned and accordingly may be regularized. Any of a variety of regularization techniques may be used, including truncated singular value decomposition (TSVD). In TSVD, small singular values may be discarded and only the strongest singular values may be kept. Thus, if more singular values are kept the resolution may improve, but if some singular values are small compared to the rest, the system may be unstable and more sensitive to noise. If only a low number of singular values are kept, noise can be mitigated, but information may be lost in the process (e.g., yielding regularization errors). Hence, an optimal truncation point may in some examples be found.

There are several methods to find an optimal truncation point. These include unbiased predictive risk estimator, discrepancy principle, generalized cross validation, and the L-curve method. The L-curve method may be more robust in the presence of correlated errors and may not need prior information about the errors. The L-curve generally is a parametric plot of the norm of the regularized solution $\hat{x}$ versus the norm of the corresponding residual $H\hat{x}-y$. The corner of the L-curve may correspond to a good balance between minimization of the sizes, and the corresponding residuals. At this point the solution may change from being dominated by regularization errors to being dominated by noise. Assuming measurement noise remains constant across all positions, the optimal truncation may need to be found only once, as it can be used for all sub-partitions.

Accordingly, examples described herein may utilize partitioned reconstruction methods based on model inversion. The system model may be divided into partitions based on geometry (e.g., antenna position and/or point scatterers within a particular beamwidth of the antenna), and each partition may be post processed separately. Approximation methods (e.g. matched filter) or generalized inverse methods (e.g. pseudo inverse) may be used to find the inversion of the partitions and provide estimates of reflectivity values associated with a scene. To reconstruct the final image, multiple (e.g., all) estimates may be combined (e.g., coherently summed). The implementation of the partitioned system allows for parallel processing, which may be efficiently performed on one or more graphic processing units, for example.

Figure 2:
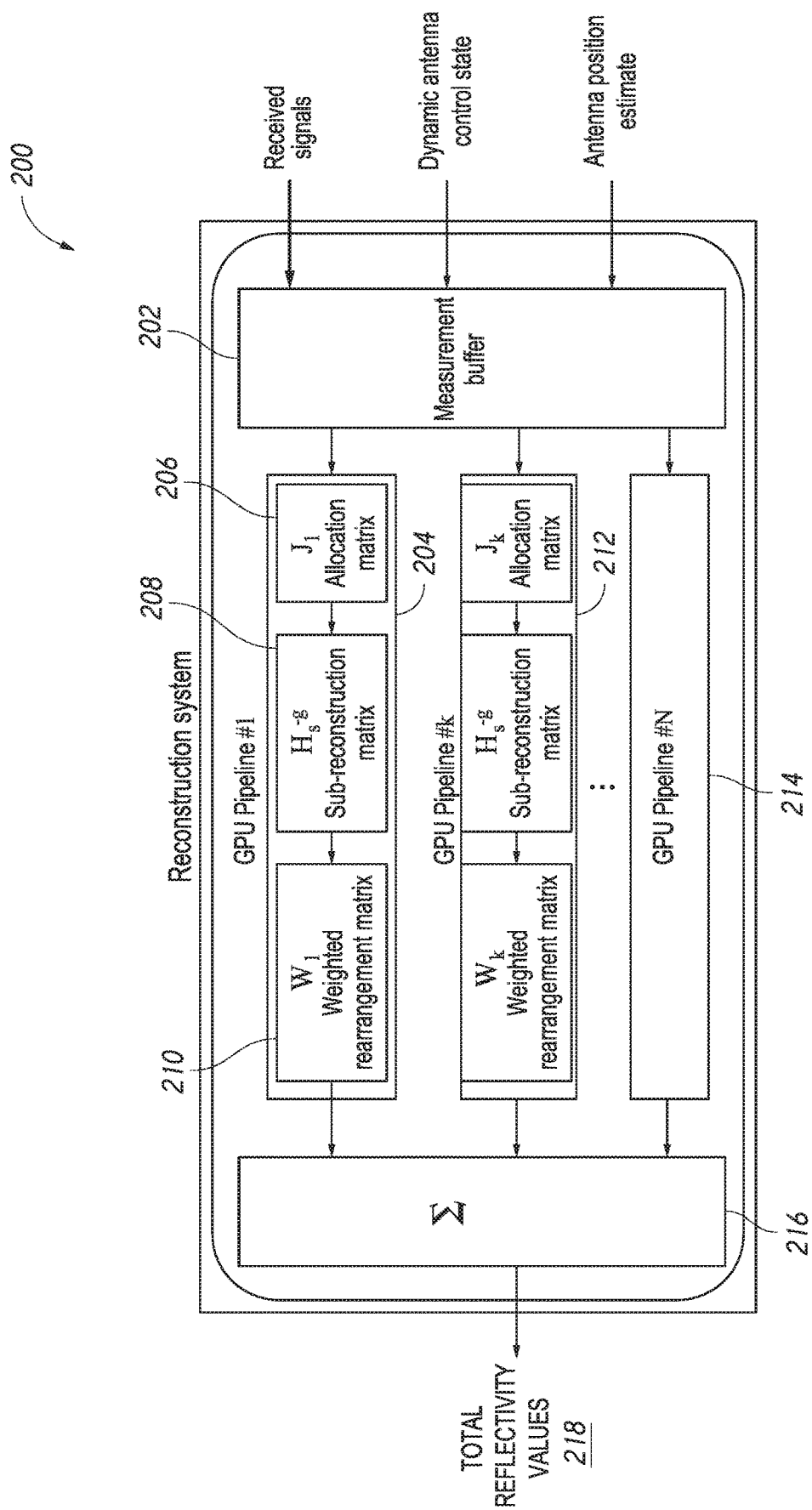
FIG. 2 is a schematic illustration of a reconstruction system arranged in accordance with examples described herein.

FIG. 2 is a schematic illustration of a reconstruction system arranged in accordance with examples described herein. The reconstruction system 200 may include buffer 202 and a number of pipelines, including GPU pipeline 204, GPU pipeline 212, and GPU pipeline 214. The GPU pipeline 204 includes allocation matrix 206, sub-reconstruction matrix 208, and weighted rearrangement matrix 210. The reconstruction system 200 includes combiner 216. Additional, fewer, and/or different components may be used in other examples. The reconstruction system 200 may be used to implement and/or may be implemented by reconstruction systems described herein, such as reconstruction system 124 of FIG. 1.

Reconstruction systems described herein, such as reconstruction system 200 of FIG. 2, may be implemented using memory and one or more processing units (e.g., processors). In some examples, the memory may be encoded with executable instructions, which when executed, cause the system to perform actions described herein. In this manner, reconstruction systems described herein may be programmed to perform partitioned inverse techniques.

Reconstruction systems described herein, such as reconstruction system 200 may include one or more buffers, such as buffer 202. The buffer 202 may buffer (e.g., store) received signals (e.g., numeric values corresponding to the scattered signals) for use in the reconstruction techniques described herein. The reconstruction system 200 may receive a variety of signals. Received scattered signals from a scene responsive to interrogation signals may be received, for example from RF transceiver 108 of FIG. 1. Dynamic antenna control state signals may be received, for example from controller 120 of FIG. 1. Antenna position estimates may be received, for example from position estimator 122 of FIG. 1. These signals (e.g., data carried by the signals) may be stored in buffer 202.

Reconstruction systems described herein may construct and invert a measurement matrix. The measurement matrix, for example, may be constructed and inverted based on a particular antenna position. Any of a variety of antenna positions may be chosen with which to construct and invert the measurement matrix—including, but not limited to, a first position, a last position, a mid-point position, or some other position. Generally, the measurement matrix may be constructed and inverted to reconstruct everything within a particular beamwidth (e.g., a 3-dB beamwidth) cone from the apex at the antenna to a certain predefined distance into the scene. Construction and/or inversion of the measurement matrix may be solved using parallel computations, for example utilizing a GPU which may have any number of processor cores, including 1000s of cores in some examples. The parallel computations available in a GPU may advantageously speed up the construction and/or inversion of the measurement matrix.

Because the measurement matrix may be constant across partitions described herein, the same measurement matrix (e.g., an inverse of the measurement matrix) may be used to estimate reflectivity values for each of a plurality of partitions. As described herein, the inverse of the measurement matrix may be calculated using matched filter and/or pseudo inverse techniques.

Reconstruction systems described herein may partition the calculation of reflectivity values for a scene. An estimate of the reflectivity values may be calculated for each partition. The estimates may be calculated in some examples for multiple partitions in parallel, and in some examples for all partitions in parallel. While parallel computation of estimates for each partition may not be used in all examples, parallel computation may advantageously speed up a time until computation of the final reflectivity values for a scene. The reconstruction system 200 of FIG. 2 illustrates three GPU pipelines for parallel computation of three partitions—including GPU pipeline 204, GPU pipeline 212, and GPU pipeline 214. A total of N GPU pipelines may be used. Each pipeline may generate an estimate of reflectivity values for a particular partition—e.g., for a particular antenna position and/or for scatterers in the scene within a particular beamwidth of the antenna. While three pipelines are shown in FIG. 2, any number may be used including 1, 2, 3, 4, 5, 6, 7, 8, 9, 10, 50, 100, 200, 300, 400, 500, 600, 700, 800, 900, 1000, 2000, 3000, 4000, 5000, 6000, or another number of pipelines. In some examples, the pipelines may each correspond with one or multiple processor cores of a GPU. In some examples, a particular processor core of a GPU may be utilized to process data from multiple pipelines.

In some examples, the hardware and software described herein may be co-designed. For example, aspects of the imaging system (e.g., the number of antennas used, the number of locations used for partitioning, and/or the particular beamwidth from the antenna used for partitioning) may be selected in accordance with a GPU architecture (e.g., a number of available GPU pipelines or cores) so as to utilize as many GPU pipelines in parallel as possible in some examples.

Accordingly, examples of reconstruction systems described herein may estimate reflectivity values associated with a scene for multiple partitions. As described herein, the estimate of reflectivity values may be calculated using an allocation matrix, a measurement matrix, and a weighted rearrangement matrix. For example, the GPU pipeline 204 of FIG. 2 includes allocation matrix 206, sub-reconstruction matrix 208 (which may be referred to as a measurement matrix), and weighted rearrangement matrix 210. Each of the matrices shown operate on the data in the pipeline to provide an estimate of reflectivity values for a partitioned set of data.

Examples of pipelines described herein may include an allocation matrix, such as allocation matrix 206 of FIG. 2. The allocation matrix, $J_k$, where k is the number of the pipeline, operates to select data from the buffer 202 according to the partition that is being computed by the pipeline. For example, the allocation matrix may select data from the buffer 202 associated with a particular partition, and provide the data for the partition to the measurement matrix (e.g., to sub-reconstruction matrix 208). Generally, the allocation matrix 206 would be multiplied or otherwise combined with the data in buffer 202 to provide selected data to the sub-reconstruction matrix 208.

Examples of pipelines described herein may include a measurement matrix, such as sub-reconstruction matrix 208 of FIG. 2. The sub-reconstruction matrix 208 may generally be a constructed and inverted measurement matrix, as described herein, and represented by $H_s^{-g}$ in FIG. 2. Note that, in some examples, the same constructed and inverted measurement matrix may be used in multiple pipelines (e.g., in GPU pipeline 204 and in GPU pipeline 212 and in GPU pipeline 214). The constructed and inverted measurement matrix may generally be multiplied or otherwise combined with the selected data received from the allocation matrix operation. The sub-reconstruction matrix may accordingly provide an estimate of reflectivity values associated with the scene for the partition to a weighted rearrangement matrix.

Examples of pipelines described herein may include weighted rearrangement matrices, such as weighted rearrangement matrix 210 of FIG. 2. The weighted rearrangement matrix 210 may generally be a weighted matrix which may rearrange the elements in the estimates of reflectivity to coincide with coordinates of the actual scene. The data from the sub-reconstruction matrix operation may be multiplied or otherwise combined with the weighted rearrangement matrix to provide rearranged estimates of reflectivity values. The rearranged estimates of reflectivity values may be provided to a combiner.

Examples of pipelines described herein may include a combiner, such as combiner 216 of FIG. 2. The combiner may generally combine estimates of reflectivity values generated for each of a plurality of partitions into total reflectivity values for the scene. In some examples, the combiner may be a summer. For example, the rearranged estimates of reflectivity values received from each of the partitions may be summed to arrive at the total reflectivity values. Generally, in examples where both measurement and reconstruction grid are aligned, the partitioned reconstructions are summed to arrive at the total reflectivity values. In examples where measurements are performed in a more random fashion, the combiner 216 may include an interpolation also to realign the reconstructions into a same reconstruction grid.

Accordingly, in some examples, the total reflectivity values, e.g., the total reflectivity values 218 may be represented as:

$$\hat{x} = \sum_{m=1}^{M} W_m H_s^{-g} J_m y \qquad \text{Equation 6}$$

where $W_m$ is the weighted rearrangement matrix, $H_s^{-g}$ is the inverted measurement matrix (which may be, e.g., an inverted matrix obtained with matched filtering and/or pseudo inverse techniques), $J_m$ is the allocation matrix, and y represents all the received scattered signals.

During operation, the data may be received at the reconstruction system 200 as the data is being generated (e.g., as the antennas 106 of FIG. 1 are moving relative to scene 102). The data may be assigned to one or more partitions (e.g., fed into one or more GPU pipelines) based on the time it was collected (and, therefore, the antenna positioned used). Accordingly, processing in each pipeline may not start at exactly the same time, rather the operation of the pipelines may be staggered as data is received. In other examples, multiple partitions worth of data (e.g., all partitions of data) may be collected from the scene, stored, and assigned to multiple partitioned which may be executed in parallel with a same start time.

Examples described herein may utilize illumination systems which may provide for enhanced resolution. To maintain sufficient signal-to-noise ratio (SNR) for image reconstruction and image interpretation, synthetic aperture radar (SAR) systems may have to make a trade-off between resolution and scene size. Examples described herein describe imaging systems and modes of operation which may improve resolution while maintaining good SNR and a large scene size. Dynamic antennas (e.g., dynamic metasurface antennas) may in some examples be used which may sub-sample a large virtual beamwidth utilizing multiple smaller distinct antenna beams. Due to this parallelization in scene sampling, the constraints on the azimuth sampling rate may be relaxed in some examples while maintaining an aliasing free cross-range. Due to the versatile properties of dynamic antennas (e.g., dynamic metasurface antennas) and their cost efficient manufacturing process, examples described herein provide imaging and reconstruction systems which may be able to obtain high resolution images over a wide scene size with lower cost and complexity than competing approaches.

Dynamic antenna systems may include a single antenna, multiple (including spatially distributed) antennas, or antenna arrays where different antenna properties can be dynamically switched. Antenna properties may include, but are not limited to, polarization, center frequency, bandwidth, antenna beam direction, or beam pattern (e.g. chaotic radiation modes, pseudo-random radiation modes, frequency diverse radiation modes, different distinct beams at distinct frequency bands (e.g. for ERSM-FDMA), etc.). The dynamic antenna system may support single input single output (SISO), single input multiple output (SIMO), multiple input single output (MISO), or multiple input multiple output (MIMO) modes of operation among the transmitter(s) and receiver(s). The antenna properties may be electronically controlled using switching devices such as semiconductors (varactor diodes, PIN diodes, FETs, etc.) or voltage tunable dielectric materials (liquid crystal, barium strontium titanate, etc.). The antenna may include sub-wavelength elements, for example in the case of a metasurface antenna.

Classical SAR systems typically use a single antenna for RX/TX for obtaining stripmap mode and spotlight mode SAR images. Other SAR systems rely on antenna arrays to be more flexible in beam-steering and to avoid mechanically moving parts. Other methods like high-resolution wide swath-width (HRWS) use a dedicated TX antenna and a dedicated RX antenna array where the sub-apertures define the achieved resolution. An array of these sub-apertures may be used to improve the overall RX antenna gain.

In examples described herein, enhanced resolution modes, such as an enhanced resolution stripmap mode, may be used. In enhanced resolution modes, the scene may be interrogated with a multitude of narrow beamwidth antenna-beams, which may be created by a dynamic antenna which samples an effectively wider beam-cone. This approach may provide a similar total beamwidth to a wide-beamwidth antenna but is actually sampled by multiple narrow-beamwidth beams. This can be done a) at the same measurement position by using (sub-beam dependent) orthogonal interrogation signals (e.g. separated in frequency or signal code), and/or b) at slightly different measurement positions per sub-beam to separate the signals in time.

Sub-sampling of a wider total beamwidth via multiple narrower beams allows for separate processing of the sub-beam data and improved SNR (due to higher antenna gain of the narrow sub-beams). Also note that the spatial sampling rate per sub-beam is relaxed compared to the spatial sampling rate of the single wide-beamwidth system. Note that examples described herein could be deployed with a dedicated transmit and/or receive antenna and use the enhanced resolution technique only in receive or transmit, respectively.

In some examples, SAR systems which utilize changes in antenna beam orientation or form multiple beams at the same time (e.g., to exploit the benefits of MIMO signal processing such as MIMO gain) may use mechanical gimbaled antennas or massive phased arrays. Both technologies may possess disadvantages in terms of stability, size, complexity, and costs. Accordingly, some examples described herein may utilize dynamic antenna systems, of which dynamic metasurface antennas (MSAs) are one example. Dynamic antennas may include an array of sub-wavelength radiating elements (e.g., antenna cells) with variable electromagnetic properties. Using e.g. semiconductor or liquid crystal approaches, those antenna cells can be controlled quickly and independently with low effort to change the beamwidth, center frequency, and/or beam orientation. As they can be manufactured using established manufacturing processes, it may be simple and inexpensive to produce custom designs depending on the desired implementation. Additionally, dynamic antennas may be designed to generate a frequency diverse antenna beam pattern. This may allow examples of dynamic antennas to exhibit different beam orientations depending on the used frequency regions.

Examples described herein may allow for operation in an enhanced resolution mode which may in some examples improve the cross-range resolution and swath width by sub-sampling a large virtual beamwidth using multiple narrow antenna beams. Due to the narrow beamwidth, the azimuth sample rate can be relaxed and the SNR increases in comparison to a single antenna with an equivalent beamwidth to the virtual beam. Depending on the antenna technology and RF hardware, different virtual beam sub-sampling strategies can be applied, e.g. in the sense of time division multiple access (TDMA), frequency division multiple access (FDMA), or code division multiple access (CDMA). Dynamic antennas may relax system complexity, size, and system costs as only a single antenna is used in some examples (e.g., a single antenna having multiple sub-wavelength elements). Generally, the cross-range resolution $\delta_c$ of a SAR system may depend on the antenna beamwidth $\theta$. To improve $\delta_c$, the beamwidth $\theta$ may also need to increase. However, the SNR after image formation is inversely proportional to the cube of the beamwidth $\theta$. Accordingly, with increasing $\theta$, the SNR of the SAR system may decrease drastically. In conventional systems, accordingly, a trade-off between SNR and cross-range resolution may be necessary to obtain good SAR image quality.

Examples described herein may increase the system beamwidth $\theta$ while maintaining the same SNR, or experiencing less reduced SNR that classically predicted, is through enhanced mode techniques described herein, which exploit a set of M narrow beamwidth antennas, which sub-sample a large virtual antenna beam of beamwidth $\theta > \theta_s$, where $\theta_s$ is the beamwidth of the sub-sampling antennas. The signals $\{s_m(t)\}$ sent from the M sub-sampling antennas may be orthogonal to each other in order to distinguish between the sub-sampling antennas and minimize and/or reduce cross-talk and self-interference. Accordingly, signals may be used which are orthogonal in time (TDMA), frequency (FDMA), and/or using orthogonal codes (CDMA). Orthogonal modulation schemes such as orthogonal frequency division multiplexing (OFDM) may also be used. Scattered signals may accordingly be received from the scene responsive to each of the M sub-sampling antennas (e.g., each of a multiple beams of orthogonal signals). Reflectivity values for the scene may be obtained using a combination of the multiple beams of orthogonal signals (e.g., a sum over the M sub-sampling antennas and/or reflectivity elements). In this manner, the resolution of enhanced mode systems described herein may have a resolution which depends on the total beamwidth which is a sum of the multiple orthogonal beams used at each measurement location. However, the SNR of the system may instead be inversely proportional to the cube of the narrower beamwidth of the multiple orthogonal beams, e.g., $\theta_s$.

To obtain Doppler aliasing free measurements, the azimuth sampling distance $\Delta a$ may need to fulfill $\Delta a \leq \delta_c$. Hence, if maintaining a narrow beamwidth $\theta_s$, the azimuth sampling distance $\Delta a$ can be relaxed as it must only meet the maximum Doppler bandwidth $B_D = 2v/\lambda_0 \sin(\theta_s/2)$, where v is the speed of the antenna system. This may result from the notion that the multiple beams of orthogonal signals may be seen as multiple independent imaging systems. In some examples, post-processing may be used to up-sample the measurement data before image formation if using algorithms such as a Range-Doppler algorithm, $\Omega$k algorithm, SPECAN, or Chirp-Scaling algorithm.

In some examples, active electronically scanned arrays (AESAs) may be used to implement antennas for performing enhanced mode imaging described herein. For example, the antennas 106 may be implemented using one or more AESAs. For AESAs, the gain $A_k(\omega)$ and phase $\Phi_k(\omega)$ can be adapted individually for each array element and frequency. It is hence possible to generate different beam patterns for different frequencies and also to change those beams over time. This adaption may be performed in the digital baseband as digital signal processing methods can be applied. However, this flexibility comes with high hardware-complexity, power consumption, and costs as each AESA element generally includes analog-to-digital converters (ADC), digital-to-analog converters (DAC), amplifiers, a circulator, and up- and down-conversion mixers. This hardware complexity may make AESAs challenging for systems such as airborne or spaceborne imaging systems, which may desirably utilize light devices that draw low power.

Dynamic antenna systems may offer many benefits over traditionally used antenna arrays. Dynamic antenna systems may be capable of beam steering, complex beam forming, as well as amplitude, phase, frequency, polarization control of their individual elements, and may form frequency and spatially diverse patterns. Unlike AESA, dynamic antennas generally do not need to control the gain and phase of the base-band signal for each individual array element, rather they change the radiation properties of their elements.

Figure 3:
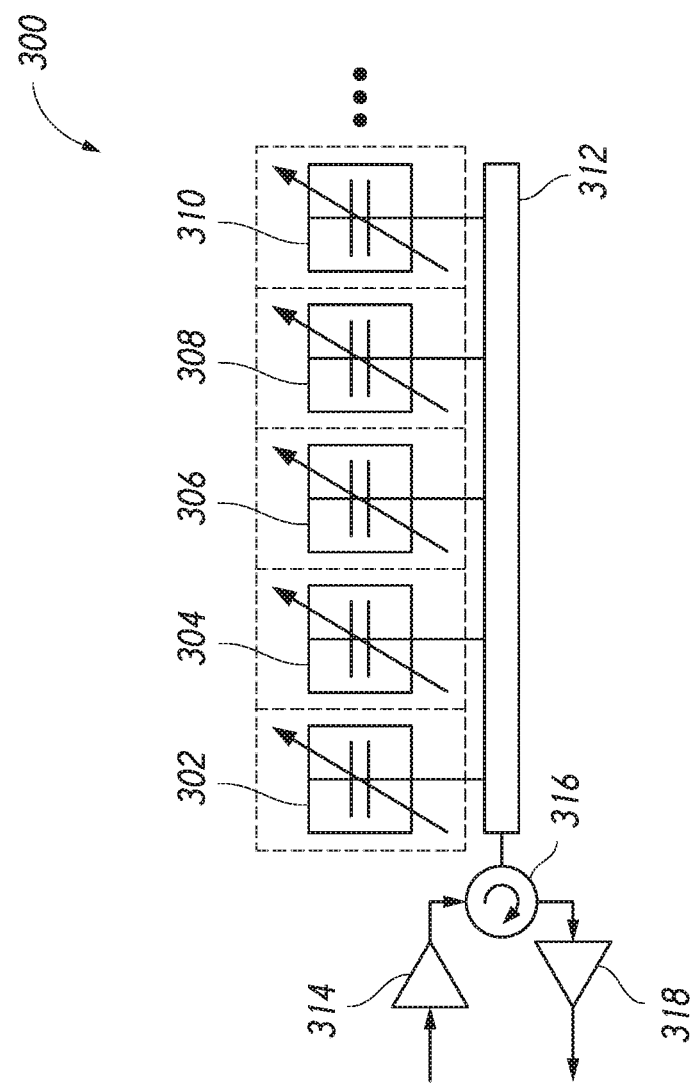
FIG. 3 is a schematic illustration of a dynamic metasurface antenna arranged in accordance with examples described herein.

FIG. 3 is a schematic illustration of a dynamic antenna arranged in accordance with examples described herein. The dynamic antenna 300 includes sub-wavelength element 302, sub-wavelength element 304, sub-wavelength element 306, sub-wavelength element 308, sub-wavelength element 310, transmission line (including but not limited to waveguide, substrate-integrated waveguide, or cavity) 312, amplifier 314, circulator 316, and amplifier 318. Additional, fewer, and/or different components may be used in other examples. The dynamic antenna 300 may be used to implement antennas described herein, such as the antennas 106 of FIG. 1.

Generally, a dynamic antenna may include a guided wave (e.g., transmission line, waveguide, substrate-integrated waveguide, or cavity 312) which may be coupled to sub-wavelength elements. Any number of sub-wavelength elements may generally be used, including but not limited to 1, 2, 3, 4, 5, 6, 7, 8, 9, 10, 100, 1000, or another number of sub-wavelength elements. Each of the sub-wavelength elements may be able to modulate phase and amplitude of an emitted signal. Each sub-wavelength element may transmit a signal $s_m(t)$ which is orthogonal to transmit signals of the other sub-wavelength elements, so they can be distinguished when they are received.

To control the dynamic antenna 300, controllers described herein (e.g., controller 120 of FIG. 1) may provide control signals for each sub-wavelength element. The control signals may determine the effect of the tuning mechanism. For example, in the case of a liquid crystal tuning mechanism, a binary pattern applied to the elements (e.g., elements 302-310) may determine which elements have a bias voltage applied to their liquid crystal layer (producing a phase change on the radiation from that element) and which ones do not. Different patterns of biased/unbiased elements produce different beam patterns. The tuning mechanism does not need to be binary (e.g., biased/unbiased); for example, a continuous-valued input voltage level could be provided for each element.

Similarly, other element tuning mechanisms, including semiconductors such as PIN diodes, varactor diodes, field effect transistors (FETs), electrically tunable dielectrics such as barium strontium titanate (BST), or combinations thereof, can also be used to allow tunability of the element without using a liquid crystal dielectric layer in some examples.

Examples described herein may utilize time division multiplexing, frequency division multiplexing, code division multiplexing, or combinations thereof to provide orthogonal signals from multiple sub-wavelength elements.

FIG. 4A and FIG. 4B are schematic illustrations of multiple beams of orthogonal signals provided using time division multiplexing in FIG. 4A and frequency division multiplexing in FIG. 4B, arranged in accordance with examples described herein.

Figure 4:
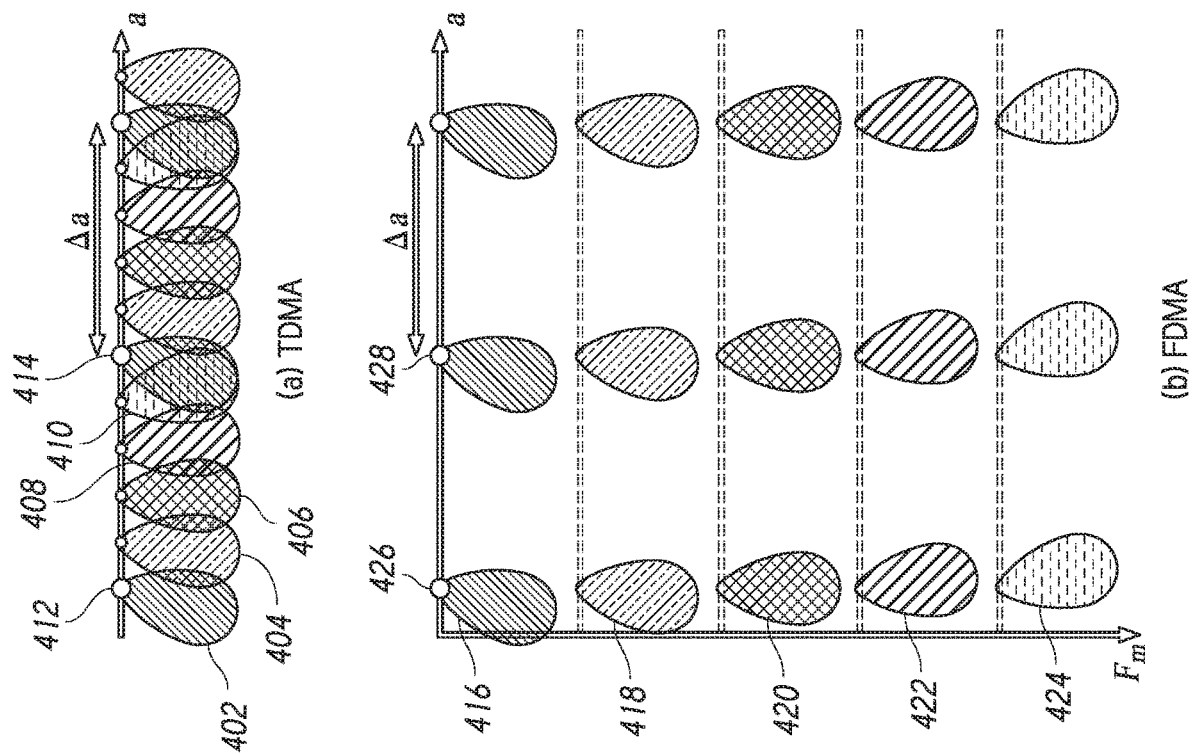
FIG. 4A and FIG. 4B are schematic illustrations of multiple antenna beams of orthogonal signals provided using time division multiplexing in FIG. 4A and frequency division multiplexing in FIG. 4B, arranged in accordance with examples described herein.

FIG. 4A illustrates beam of orthogonal signals 402, beam of orthogonal signals 404, beam of orthogonal signals 406, beam of orthogonal signals 408, and beam of orthogonal signals 410 which may be provided at different times. The axis a shown in FIG. 4A may be time. Measurement positions are indicated in FIG. 4A by a dark dot on the time axis. Accordingly, measurement position 412 and measurement position 414 are shown. The five beams of orthogonal signals 402-410 may be provided between the times of measurement position 412 and measurement position 414 and may be referred to as associated with measurement position 412. Once the measurement position 414 is reached, the five beams of orthogonal signals may again be provided, as shown in FIG. 4A, and referred to as associated with measurement position 414. Each of the beams of orthogonal signals 402-410 may be provided at a different angle. The five beams of orthogonal signals may be provided by a dynamic antenna system (e.g., by the dynamic metasurface antenna 300 in some examples). Controllers described herein, such as the controller 120 of FIG. 1 may control the dynamic metasurface antenna 300 to provide the sequence of beams shown in FIG. 4.

Note that the order of the transmit sequence (e.g., the order of beams 402-410) may vary in examples described herein. To comply with an aliasing free Doppler bandwidth, the azimuth sampling distance between two signals sent from the same antenna (e.g., between two measurement positions), should be Aa. Note the azimuth direction generally refers to a direction of antenna system movement, while "range" may refer to a direction perpendicular to the antenna system movement. In some examples, signal scheduling may take into consideration that the received signals may be received with the same sub-beam as it was transmitted to avoid and/or reduce cross-talk and self-interference. This might constrain swath width and maximum virtual beamwidth θ. Dynamic antennas may be advantageously utilized with time division multiplexing, as they have been shown to be able to switch between different beam orientations in very short time, e.g. in the range of some microseconds. Additionally, dynamic antennas may lack the need of element wise variable phase and gain stages which may make them less complex and more reliable than phased arrays.

FIG. 4B illustrates beam of orthogonal signal 416, beam of orthogonal signal 418, beam of orthogonal signal 420, beam of orthogonal signal 422, and beam of orthogonal signal 424. The beams of orthogonal signal 416-424 may be provided at different frequencies at the same time at measurement position 426. At a next measurement position, measurement position 428, the same beams of orthogonal signal at respective frequencies may again be provided. Each of the beams of orthogonal signals 416-424 may be provided at a different angle. In this manner, frequency division multiplexing or code division multiplexing may be employed in examples described herein.

In examples utilizing phased arrays to implement frequency division multiplexing as shown in FIG. 4B, an increase of complexity may be seen as full digital beamforming using AESAs may be needed to be able to process frequency dependent sub-beams. However, dynamic antennas can be designed to maintain frequency dependent sub-beams utilizing a single feed. This may reduce hardware complexity in comparison to AESAs. Also, due to the frequency diverse behavior of many dynamic antennas, each transmit signal and received signal may be linked to its sub-beam m which may minimize and/or reduce cross-talk and self-interference.

Examples described herein which utilize enhanced mode illumination techniques (e.g., multiple narrower sub-beams to sample an effectively larger beamwidth) may further utilize the partitioning inverse techniques described herein. For example, measurements may be partitioned by their steering angle. Referring to FIG. 2, for example, in some examples multiple GPU pipelines may be allocated to a single measurement position, with each GPU pipeline generating an estimate based on a particular steering angle of a beam.

Figure 5:
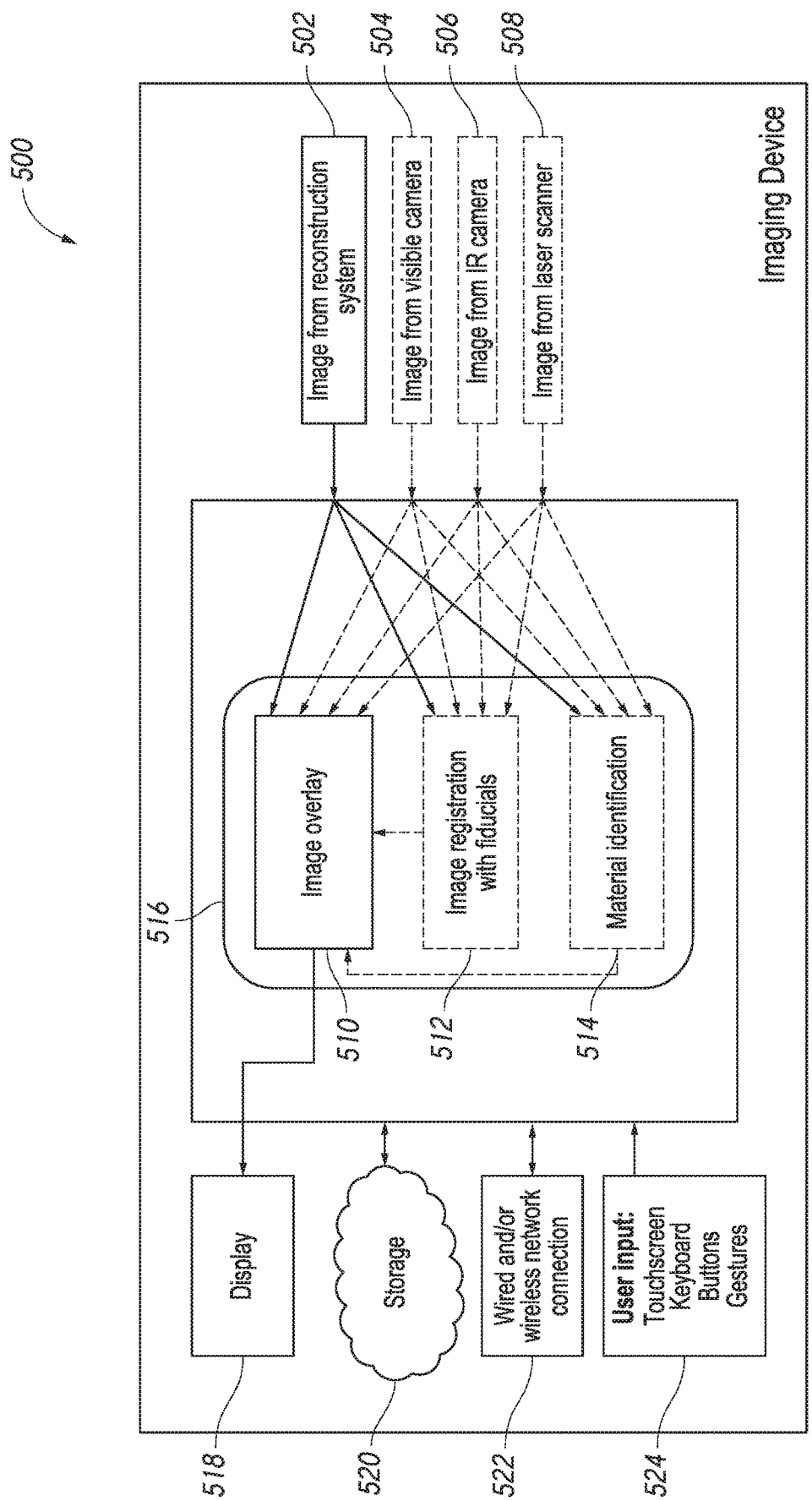
FIG. 5 is a schematic illustration of an imaging device 500 in accordance with examples described herein.

FIG. 5 is a schematic illustration of an imaging device 500 in accordance with examples described herein. The imaging device 500 may receive a variety of image data, including image data 502 (e.g., from a reconstruction system described herein, such as reconstruction system 124 of FIG. 1), image data 504 from a visible camera, image data 506 from an infrared (IR) camera, and/or image data 508 from a laser scanner. Additional, fewer, and/or different image data may be provided in other examples. The imaging device 500 may be implemented utilizing one or more processing units (e.g., processors) and memory encoded with executable instructions for performing functions described herein, including instructions for image overlay 510, instructions for image registration 512, and/or instructions for material identification 514. The imaging device 500 may further include display 518, storage 520, connection 522, and/or input/output device(s) 524. In some embodiments, display 518 may be an ordinary two-dimensional display (such as a LCD display), or display 518 may be a three-dimensional display such as a binocular stereo display, a virtual reality headset, a light-field display, or any other type of display capable of providing a three-dimensional display to the user.

In some examples of imaging device 500, the imaging device may be at least partially wearable by a user (e.g., a human user), and enable the user to view (e.g., visualize) a scene through one or more imaging modalities including microwave and/or millimeter wave, optical, infrared, etc. In such examples, the addition of the microwave and/or millimeter wave imaging capability may enable a user to navigate in the dark, or through a fog, rain, or smoke filled environment. This type of system may be particularly useful when the display 518 is a three-dimensional display.

Imaging devices described herein, such as imaging device 500, may receive total reflectivity values associated with a scene (e.g., from a reconstruction system described herein, such as reconstruction system 124 of FIG. 1 and/or reconstruction system 200 of FIG. 2). In some examples, the reconstruction system may provide pixel and/or voxel data for use in generating an image. In some examples, the imaging device (e.g., imaging device 500) may generate image data from the total reflectivity data. The image data is indicated as image data 502 in FIG. 5.

Other image data regarding a scene may additionally be provided to imaging devices described herein, such as image data received from a visible wavelength camera, IR camera, and/or laser scanner, as shown in FIG. 5 as image data 504, image data 506, and image data 508.

Imaging devices may perform image overlay. Accordingly, imaging device 500 may include instructions for image overlay 510. Several reconstructions from different imaging modalities may be overlaid to provide a range of information about the scene. One approach to superimpose images from different imaging methods is to use fiducials that are the same physical size in each image reconstruction. In the case of circular fiducials, the center position and radius of the fiducials can be found for each separate image using an image alignment algorithm such as affine transformation or image warping and scaling algorithms combined with a least squares fit. Each image can then be scaled and translated such that the fiducials are aligned. The number of fiducials used to overlay images may be selected to match the dimension of the reconstruction, e.g., if multiple 2D reconstructions are to be superimposed, at least 2 fiducials may be used, while 3D images may utilize at least 3 fiducials.

Image overlay may allow for physical information from each image modality to be displayed simultaneously. For example, a millimeter wave reconstruction and an infrared image may be superimposed to show the spatial orientation of objects in the scene, as well as their millimeter wave reflectivity and their temperature or infrared signature. Alternatively, or in addition, 2D representations of millimeter wave or infrared images may either be overlaid on an optical image, or be projected directly onto the physical scene using fiducials for alignment, allowing occluded objects to be easily oriented with respect to visible identifiers. In this case, color may be used to represent physical information given by the image reconstruction, such as reflectivity, depth, temperature, etc.

Previously acquired images of a particular scene may be uploaded to the imaging device 500 via either a wired or wireless connection or from storage 520. This may result in image overlay or side-by-side comparison to display and/or monitor changes in the scene over time. This may be done for various modalities of image data, for example the image reconstruction from the system 502, image from visible camera 504, image from IR camera 506, and image from laser scanner 508.

In some examples, a scene differencing algorithm may provide the user with a highlight or overlay to call out the changes from a previous image of a scene to a current image of a scene. In such examples, image pixels or voxels may be emphasized using graphical techniques such as coloring, shading, highlighting, shadowing, or marking with alphanumeric text or arrows to indicate the changes between past and current image pixels or voxels.

In still further examples, an object such as a parcel or packaged good may be imaged at a particular time and/or place, and then subsequently imaged at a later time and/or place. In some examples, a parcel may be imaged at a time and place when it is left with a shipper or logistics firm for transport, and then subsequently imaged at a later time and place where it is delivered. In this example, a scene differencing algorithm may provide an indication of whether the object has changed e.g. due to damage in handling or due to tampering. In such examples, an automated first-level change detection may alert a human to perform a second-level inspection to validate the detection of e.g. damage or tampering.

In further examples, the automated change detection may cause an automated handling system to separate a potentially changed object from a flow of other objects, e.g. to automatically direct potentially damaged parcels or packaged goods onto a separate conveyor belt to be queued for additional inspection.

In yet further examples, the change detection may include an automated count of the number of items inside a parcel or package.

Imaging devices described herein may provide image registration with fiducials. Accordingly, imaging device 500 may include instructions for image registration 512. Fiducials generally refer to physical signatures that may facilitate alignment between the physical scene and one or more imaging modalities. Fiducials may aid in image overlay and system alignment, and may provide metadata about the scene. Fiducials may be designed to be highly visible in the modality they are being imaged with. For example, millimeter wave fiducials may either be highly reflective or highly absorptive in the millimeter wave bands to ensure contrast between the fiducial and the materials comprising the scene. Visible-light fiducials may have a high-contrast colored pattern on a background allowing them to be easily distinguished from the materials comprising the scene. Infrared fiducials may similarly be reflective or absorptive in the infrared spectrum.

Fiducials may be either a permanently installed object having known features, or a temporarily installed object having known features. One example of a fiducial is a self-adhesive sticker bearing one or more alignment marks that are reflective both to millimeter wave energy as well as visible light. Such a fiducial may be constructed using a laminated paper or plastic sticker having an outer layer that is optically reflective, but at least partially transparent to millimeter waves. Then an inner layer may be implemented with a metal film or foil to reflect millimeter waves. In some embodiments, the inner layer may be patterned with a circle or cross-mark that is aligned with a circle or cross-mark printed in ink on the outer layer. The ink used to mark the outer layer may be reflective both to visible light and to millimeter waves. Such an ink may be comprised of a dispersion of metallic or carbon particles in a colored ink base. In some embodiments, the ink may be patterned with a checkerboard pattern or a QR code.

In examples where multiple imaging modalities are interfaced to image a single scene, the fiducial may have a known physical size and shape as observed by each of the imaging modalities used in the imaging platform, aiding in accurate image overlay. For example, an imaging system integrating a millimeter wave imager, an infrared camera, and an optical camera may employ a fiducial including an inner metal foil covered with an outer patterned layer having a high visible-light contrast. In this example, the outer patterned layer may be used to reflect visible light and thus to present a known pattern at the optical camera. At the same time, the inner metallic layer may reflect the millimeter wave illumination and any infrared illumination to the millimeter wave imager and the infrared camera respectively, to form a known image in these modalities. Using any of a variety of image alignment algorithms (such as affine transformation or image warping and scaling algorithms combined with a least squares fit), the respective fiducial shapes may be aligned between each of the imaging modalities. Once the fiducial shapes are so aligned, the geometric parameters determined by the image alignment algorithms may be used to align the complete images from each of the imaging modalities.

Examples of imaging devices described herein may perform material identification. Accordingly, imaging device 500 may include instructions for material identification 514. Millimeter wave imaging generally uses coherent illumination of a scene with millimeter wave energy to build 2D or 3D images of the scene. The scattered millimeter wave energy from the scene may be complex-valued, wherein the phase and amplitude of the scattered energy across the illumination frequency band may vary based on the dielectric properties of the materials that the illuminating wave has interacted with in the scene. Using extraction techniques, this information can be used to estimate the dielectric constants (e.g., permittivity and permeability) of these materials. This may be performed by using multilayer models to extract the dielectric properties of objects partially-occluded behind other materials.

Once the dielectric characteristics of the materials in the scene have been estimated, these values may be matched to a database of common materials which may be expected to be in the scene. The database may be stored, for example, in storage 520. In an example construction implementation, such dielectric parameters may be used to discriminate between image pixels or voxels representing PVC pipes, wood, tile, and/or metallic objects such as copper pipes or wires.

Once this discrimination has been accomplished, the image pixels or voxels may be emphasized using graphical techniques such as coloring, shading, highlighting, shadowing, or marking with alphanumeric text or arrows to indicate the materials comprising particular image pixels or voxels. Alternatively, a user may select certain materials from a list of potential materials, using a user interface such as a graphical user interface or a touch-screen interface. The user may thus command the imaging device to either show or hide pixels or voxels containing certain materials, or excluding certain materials.

Examples of imaging devices may include one or more displays, such as display 518. Generally, any type of display may be used, and the display may display images of a scene generated by systems and methods described herein.

Examples of imaging devices may include storage, such as storage 520. Generally, any kind of electronic storage may be used—e.g., RAM, ROM, Flash, disk drives, solid state drives, etc. Image data and/or reflectivity values may be stored in storage 520 in some examples.

Examples of imaging devices described herein may include one or more wired and/or wireless communication connections, such as connection 522, This may allow data, including image data, to be transferred from the imaging device to other computing devices in some examples.

Examples of imaging devices described herein may include one or more input/output devices, such as input/output device(s) 524. Any number and variety of such devices may be used including, but not limited to one or more keyboards, mice, buttons, gesture detectors, speech recognition systems, and/or voice decoders.

Examples of imaging systems and methods described herein may find use in a variety of fields and/or for imaging a variety of scenes. Examples include personnel screening (e.g., imaging one or more humans to identify contraband which may be positioned beneath clothing and not externally visible to the human eye), weapon detection (e.g., imaging one or more humans and/or bags or other containers to identify weapons which may not be visible to the human eye), reconnaissance, autonomous robotics, non-destructive testing, in-process inspection of packaged goods, structural evaluation, and/or remote sensing (e.g., imaging an environment remote from an operator). In some examples, the scene to be imaged includes one or more inanimate objects and their constituent parts. This can include objects such as cars, aircraft, other vehicles, or buildings. Other examples of scenes include parts of buildings such as walls, ceilings, floors, columns, pipes, wiring, or other utilities. Further examples include the ground, and/or objects at least partially buried in the ground. Still further examples of scenes include one or more objects within a container such as a box.

For remote sensing applications, illumination system(s) and receiver(s) may be positioned in the environment to be sensed. Data, such as receiver signal(s) and/or image data described herein may be transmitted from the environment to another location (e.g., a remote and/or centralized workstation) for the rendering of an image of all or part of the environment.

EXAMPLES

An example implementation generated results based on synthesized data for three techniques for comparison purposes—full inverse (FI), matched filter (MF), and partitioned inverse (PI). The simulation setup assumed a horn antenna with a half power beam width of 58°. The antenna was moved over 0.10 m at intervals of 4 mm, with a looking angle of 30° and a platform height of 0.3 m. Frequencies from 20 GHz to 26 GHz were used with a sampling interval of 60 MHz (e.g., 101 values). The scene to be reconstructed was 0.2 m in ground-range and 0.484 m in cross-range. These values were chosen to make reconstruction using full inverse possible on the workstation used (Intel core i7-6700 CPU at 3.4 GHz with 16 GB memory).

The model resolution spread for FI, MF and PI was calculated. The values were normalized using the norm of I. The maximum number of singular values retained was 101, as that is the minimum size of Hs. The resolution spread of FI and PI changed with the amount of truncation, and at 101 points it was 0.9919 and 0.9789 respectively. The resolution spread of ME was 0.9984, and was near the lower bound of both FI and PT. There was an improvement of 2% and 1.3% in the resolution spread in PT over MF and FI respectively, at 101 points.

For PI, the number of reconstruction points was much less than for FI. Therefore, when a small number of singular values are kept, the model resolution R was higher for PI than for FI. Furthermore, in PT only the points in the partitioned scene affects the estimate and most of the off-diagonal elements in R were near zero.

L-curves for PI with various SNR values were plotted. The corner points of the L curves represented the optimal truncation point for the respective noise levels; 30 dB SNR: 17 points, 20 dB SNR: 15 points, 10 dB SNR: 13 points and 0 dB SNR: 11 points. As the noise level increased, the norm of the residual also increased.

The effect of different noise levels for a point spread function (PSF) with a fixed truncation of 15 points was investigated. For signals with 0 dB and 10 dB SNR, the point scatterer was not resolvable. For signals with lower noise levels, the resolution of the PSF was 1.87 cm in ground-range and 2.38 cm in cross-range, which remains the same as the truncation point is fixed.

PSFs using optimal truncation points for different noise levels were investigated. As the resolution depends on the amount of truncation, for different noise levels different resolutions can be observed. In an ideal case with no noise, the PSF would be a peak as there is no truncation. When the noise level increases the resolution degrades. Ground-range resolution for respective noise levels were, 0 dB SNR: 2.36 cm, 10 dB SNR: 2.09 cm, 20 dB SNR: 1.86 cm, and 30 dB SNR: 1.69 cm.

However, as the cross-range data is limited, a resolution degradation was not visible where the cross-range resolution was 2.38 cm across all noise levels. This suggests that the PT method is robust to noise.

Resolution with MF was 3.10 cm in ground-range and 2.40 cm in cross-range, while resolution with FI was 1.33 cm and 2.07 cm respectively. When computing the FI, the default truncation level computed by Matlab (506) was used, and thus a good resolution was achieved. However, even for 0 dB SNR, the resolution has improved by 24% in ground-range and by 0.83% in cross-range for PT over MF.

For a reconstruction of the PSF, PT took 1.9 s, MF 7.2 s and FI 2200 s, making PI 1200 times faster than FI and 4 times faster than MF.

Experimental results using a Pasternack PE9852/2F-10 K-band horn antenna with a half power beam width of 58° were obtained. The antenna was moved 0.57 in at a spacing of 4 mm and a looking angle of 60° on a platform at a height of 0.3 m. Frequencies from 15 GHz to 26.5 GIL were used, spaced at 50 MHz intervals. At each antenna position, transfer function measurements were collected using an Agilent A5222N vector network analyzer. The reconstruction scene was 0.6 m in ground-range and 1.1 m in cross-range. The cross-range was chosen to reconstruct the scene as observed by all antenna positions. A circle of point scatterers consisting of eighteen ¼"-20 nuts was used as the scene to be imaged. The nuts were placed equidistantly on a circle of 13 cm in diameter.

Reconstructed images using ME and PI were obtained, where reflectivity was normalized. Reconstruction using FI was not possible with the available 16 GB of memory. The ME and PI images showed essentially no visible difference. This suggested that PI works amidst real measurement noise. Reconstruction using MF took 230 s while PT took only 29 s, making PI 8 times faster on the workstation used.

In another example, experimental results using a Pasternack PE9852/2F-10 K-band horn antenna with a half power beam width of 58° were obtained. The antenna was moved 59.2 cm in azimuth and 61.2 cm in elevation at a spacing of 4 mm. Frequencies from 15 GHz to 26.5 GHz were used, spaced at 200 MHz intervals. At each antenna position, transfer function measurements were collected using an Agilent A5222N vector network analyzer. The scene as observed by all antenna positions was 0.2 m in ground-range, 1.252 min azimuth and 1.256 m in elevation. The used scene was a metal coated balloon dog. The reconstruction was performed in Matlab.

Reconstructed images using conventional matched filter, partitioned matched filter and partitioned pseudo inverse were generated, where the reflectivity is normalized and represented on a log scale. Reconstruction using conventional pseudo inverse was not possible with the available 16 GB of memory. The partitioned pseudo inverse was computed using singular value decomposition (SVD) and the solution was regularized by truncating the small singular values. The optimal number of singular values to be retained was found as 23, with the use of L curves. The partitioned pseudo inverse solution essentially showed no visible difference when compared with the conventional matched filter and had visibly less clutter than the partitioned matched filter.

Table 1 shows the time taken to reconstruct the 3D image using different algorithms. An NVIDIA GeForce GTX 960 GPU with 4 GB memory was used to accelerate the computation. The reconstruction with GPU acceleration took 41 s and 50 s with the partitioned matched filter and partitioned pseudo inverse, respectively. This timing includes the construction of the sub-measurement matrix and its inversion. However, as the reconstruction matrix can be computed offline, the reconstruction time reduces to 41 s for both cases. In contrast, it took 12847 s (around 3.5 hours) with the conventional matched filter reconstruction.

TABLE 1

TIME TAKEN FOR 3D IMAGE RECONSTRUCTION

|  | Conventional matched filter (8) | Partitioned matched filter (3) | Partitioned psuedoinverse (8) |
|---|---|---|---|
| GPU | 12847 | 41 | 50 |
| CPU (4 cores) | not parallelised | 1588 | 1597 |
| CPU (single core) | 149615 | 1614 | 1648 |

The GPU performance was compared against the performance of an Intel Core i7-6700 CPU at 3.4 GHz with 16 GB memory, using a single core and 4-cores. The timings are shown in Table 1. For multi-core CPU processing, the algorithms were implemented using a spmd (single program, multiple data) function in Matlab. However, there is a communication overhead involved with parallelism and due to the large amount of data, a reasonable improvement was not achieved with using multiple parallel cores.

From the foregoing it will be appreciated that, although specific embodiments have been described herein for purposes of illustration, various modifications may be made while remaining with the scope of the claimed technology.

What is claimed is:

1. A method of image reconstruction, the method comprising:
   receiving scattered signals from a scene, wherein the scattered signals are responsive to interrogation of the scene, by an antenna system comprising at least one antenna, at multiple relative positions between the at least one antenna and the scene, and wherein the receiving scattered signals from the scene comprises storing numeric values corresponding to the scattered signals in a memory or storage buffer;
   constructing and inverting a measurement matrix based on signals received responsive to interrogation at a first relative position;
   calculating multiple estimates of reflectivity values of the scene, each of the multiple estimates corresponding to a particular relative position of the at least one antenna, and each of the multiple estimates being calculated using the measurement matrix, wherein the calculating multiple estimates of reflectivity values of the scene is performed at least in part by assigning the numeric values from the memory or storage buffer to each of the multiple estimates using an allocation matrix;
   combining the multiple estimates of the reflectivity values to generate total reflectivity values for the scene; and
   generating image data based on the total reflectivity values.

2. The method of claim 1, wherein said calculating comprises calculating at least a portion of the multiple estimates of reflectivity values in parallel.

3. The method of claim 2, further comprising assigning respective calculations of the multiple estimates to respective cores of a graphics processing unit (GPU) for parallel processing.

4. The method of claim 1, wherein said constructing and inverting comprises at least one of matched filtering, inverse filtering, or pseudo inverse filtering.

5. The method of claim 4, wherein said constructing and inverting comprises using pseudo inverse filtering, and the method further comprises regularizing the measurement matrix using truncated singular value decomposition.

6. The method of claim 5, further comprising determining a truncation value, the determining comprising applying at least one of an unbiased predictive risk estimator, a discrepancy principle, a generalized cross validation, or an L-curve method.

7. The method of claim 1, wherein said combining comprises summing or weighted summing.

8. The method of claim 1, further comprising moving the antenna system relative to the scene in a raster-scan pattern.

9. The method of claim 1, further comprising moving the antenna system relative to the scene in a linear motion.

10. The method of claim 1, further comprising moving the antenna system relative to the scene in a free-form motion, and determining the relative position of the antenna system with respect to the scene using a relative position sensor.

11. The method of claim 1, wherein each of the multiple estimates are calculated only for portions of the scene within a predetermined beam-width of the at least one antenna.

12. The method of claim 11, wherein the portions of the scene are determined separately for each of the multiple relative positions between the at least one antenna and the scene.

13. The method of claim 1, wherein generating image data based on the reflectivity values comprises generating 2D pixel data, 3D voxel data, or combinations thereof, corresponding to the reflectivity values.

14. The method of claim 1, wherein each of the at least one antennas of the antenna system are mechanically coupled to each other, and wherein the method further comprises physically moving the antenna system relative to the scene to provide the multiple relative positions.

15. The method of claim 1, wherein each of the at least one antennas are stationary with respect to the scene, and each of the at least one antennas are located at a different position relative to the scene.

16. The method of claim 1, wherein the calculating multiple estimates of reflectivity values of the scene utilizes partitioned inverse techniques.

17. The method of claim 1, wherein the multiple relative positions include at least one of a predetermined relative position, a starting relative position, an ending relative position, and another selected position in an illumination pattern of the antennas.

18. A method of image reconstruction, the method comprising:

receiving scattered signals from a scene, wherein the scattered signals are responsive to interrogation of the scene, by an antenna system comprising at least one antenna, at multiple relative positions between the at least one antenna and the scene;

constructing and inverting a measurement matrix based on signals received responsive to interrogation at a first relative position;

calculating multiple estimates of reflectivity values of the scene, each of the multiple estimates corresponding to a particular relative position of the at least one antenna, and each of the multiple estimates being calculated using the measurement matrix, and wherein calculating multiple estimates of reflectivity values further comprises using respective weighted matrices to reorder the reflectivity values in accordance with the scene;

combining the multiple estimates of the reflectivity values to generate total reflectivity values for the scene; and generating image data based on the total reflectivity values.

19. The method of claim 18, wherein said calculating comprises calculating at least a portion of the multiple estimates of reflectivity values in parallel.

20. The method of claim 19, further comprising assigning respective calculations of the multiple estimates to respective cores of a graphics processing unit (GPU) for parallel processing.

* * * * *